(12) United States Patent
Hamel et al.

(10) Patent No.: US 9,135,504 B2
(45) Date of Patent: Sep. 15, 2015

(54) METHOD AND SYSTEM USING TWO PARALLEL OPTICAL CHARACTER RECOGNITION PROCESSES

(71) Applicant: TECHNOLOGIES HUMANWARE INC., Drummondville (Québec) (CA)

(72) Inventors: Pierre Hamel, Verdun (CA); Alain Bélanger, Longueuil (CA); Éric Beauchamp, La Prairie (CA)

(73) Assignee: TECHNOLOGIES HUMANWARE INC., Drummondville (Quebec) (CA)

( * ) Notice: Subject to any disclaimer, the term of this patent is extended or adjusted under 35 U.S.C. 154(b) by 6 days.

(21) Appl. No.: 14/256,070

(22) Filed: Apr. 18, 2014

(65) Prior Publication Data

US 2014/0314319 A1    Oct. 23, 2014

Related U.S. Application Data

(60) Provisional application No. 61/814,479, filed on Apr. 22, 2013.

(51) Int. Cl.
*G06K 9/34* (2006.01)
*G06T 7/00* (2006.01)
*G06K 9/00* (2006.01)

(52) U.S. Cl.
CPC ............ *G06K 9/00442* (2013.01); *G06K 9/344* (2013.01)

(58) Field of Classification Search
None
See application file for complete search history.

(56) References Cited

U.S. PATENT DOCUMENTS

| 5,134,669 | A | 7/1992 | Keogh et al. | |
|---|---|---|---|---|
| 9,053,350 | B1 * | 6/2015 | Abdulkader et al. | 1/1 |
| 2005/0288932 | A1 * | 12/2005 | Kurzweil et al. | 704/260 |
| 2007/0104370 | A1 * | 5/2007 | Rosenbaum | 382/182 |
| 2009/0316999 | A1 | 12/2009 | Kim et al. | |
| 2012/0213429 | A1 | 8/2012 | Vasudevan et al. | |
| 2013/0236111 | A1 | 9/2013 | Pintsov | |

OTHER PUBLICATIONS

Yu et al, Applying SIMD to Optical Character Recognition (OCR), 2008, Proc. of SPIE vol. 7000, pp. 1-9.*

* cited by examiner

*Primary Examiner* — Bhavesh Mehta
*Assistant Examiner* — David F Dunphy
(74) *Attorney, Agent, or Firm* — Hovey Williams LLP

(57) ABSTRACT

A method and a system for providing a text-based representation of a portion of a working area to a user are provided. The method includes acquiring an image of the entire working area and performing a fast OCR process on at least a region of interest of the image corresponding to the portion of the working area, thereby rapidly obtaining an initial machine-encoded representation of the portion of the working area and immediately presenting it to the user as the text-based representation. Parallelly to the fast OCR process, a high-precision OCR process is performed on at least the region of interest of the image, thereby obtaining a high-precision machine-encoded representation of the portion of the working area. Upon completing the high-precision OCR process, the high-precision machine-encoded representation of the portion of the working area is presented to the user as the text-based representation, in replacement of the initial machine-encoded representation.

27 Claims, 15 Drawing Sheets

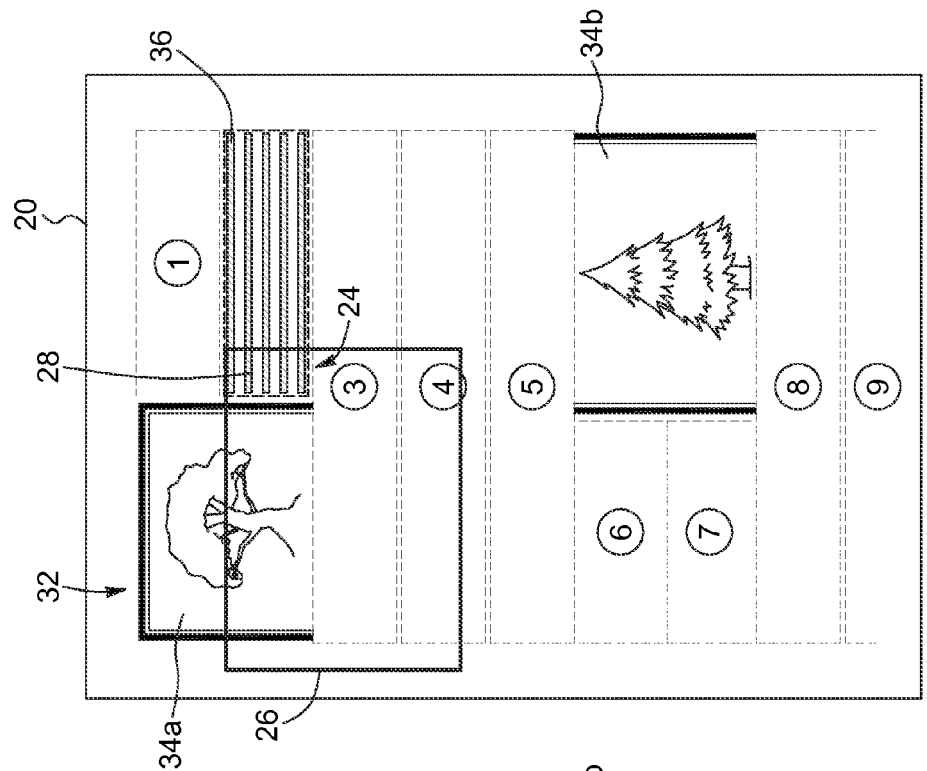
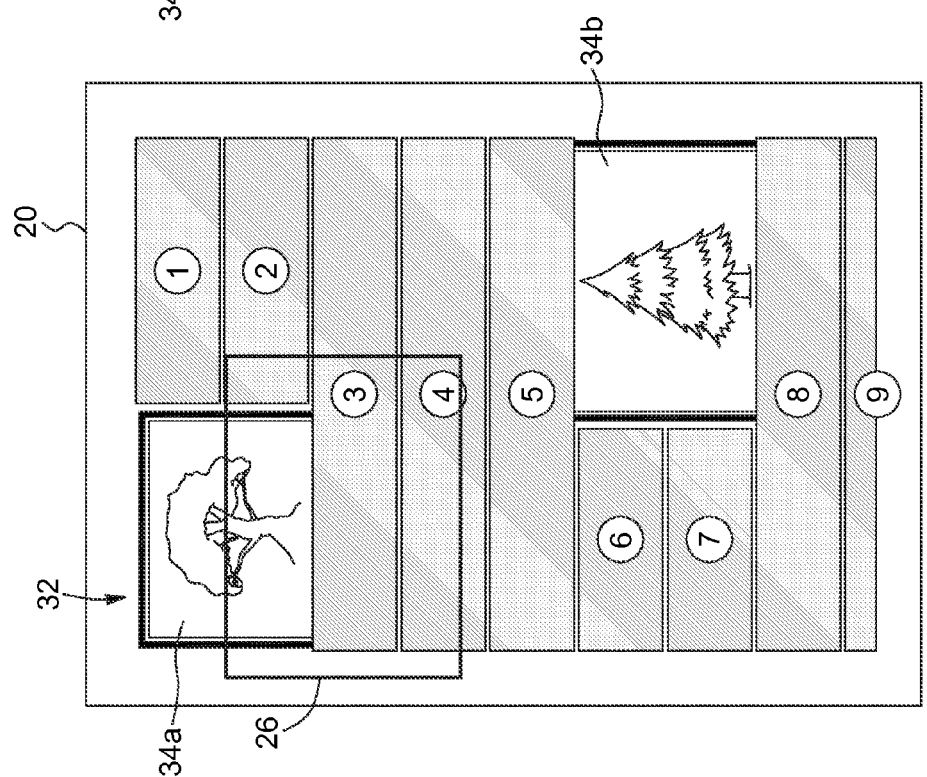
FIG. 2D
FIG. 2C

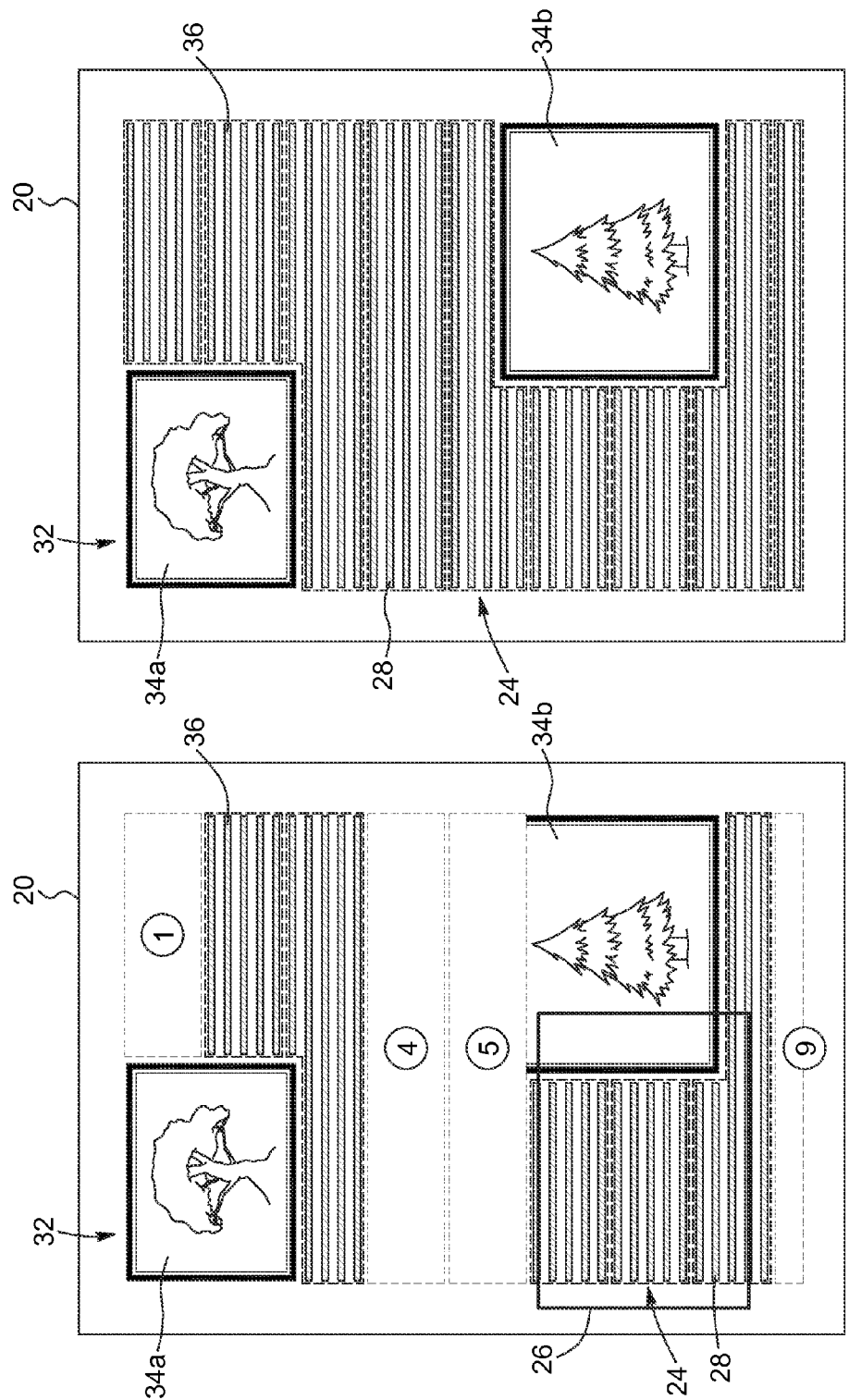

METHOD AND SYSTEM USING TWO PARALLEL OPTICAL CHARACTER RECOGNITION PROCESSES

RELATED APPLICATION

This application claims priority benefit of a provisional application entitled, "METHOD AND SYSTEM USING TWO PARALLEL OPTICAL CHARACTER RECOGNITION PROCESSES," Ser. No. 61/814,479, filed Apr. 22, 2013 and incorporated by reference herein in its entirety.

TECHNICAL FIELD

The present invention generally relates to the field of presenting contents using optical character recognition (OCR) processes, and more particularly concerns a method and a system using two parallel OCR processes to provide a text-based representation of a portion of a working area to a user.

BACKGROUND

Loss of visual acuity is a growing concern worldwide. The World Health Organization currently estimates to 2.5% the incidence of low vision in industrialized countries and this figure is expected to continue to increase with ageing population. Low vision may be generally referred to as a condition where ordinary eye glasses, lens implants or contact lenses are not sufficient for providing sharp sight. The largest growing segment of the low-vision population in developed countries is expected to be people aged 65 years old and older. This is mainly due to age-related eye diseases such as macular degeneration, glaucoma and diabetic retinopathy, cataract, detached retina, and retinitis pigmentosa. Some people are also born with low vision.

Low-vision individuals often find it difficult, if not impossible, to read small writing or to discern small objects without high levels of magnification. This limits their ability to lead an independent life because reading glasses and magnifying glass typically cannot provide sufficient magnification for them. In order to assist low-vision individuals in performing daily tasks, various magnification devices and systems are known in the art.

Among such devices and systems, desktop video magnifiers generally include a video monitor mounted on a stand having a gooseneck shape. A camera having a large optical zoom is installed on the stand over a working area on which a user disposes an object to be magnified, typically a document with textual content that the user wishes to read. The camera feeds a video processor with a video signal of a portion of the working area, and the video processor in turn feeds this video signal with an increased sharpness and enhanced contrast to the video monitor. The document is typically disposed on an XY translation table assembled on rails, allowing the user to freely move the XY table and the document thereon to bring different portions of the document within the field of view of the camera.

Conventional video magnifiers can be provided with optical character recognition (OCR) capabilities to allow low-vision individuals to access textual information. OCR generally refers to the operation of translating textual information contained in an image into machine-encoded text. Once extracted from the image, the machine-encoded text may be displayed to a user as suitably magnified text on a monitor, or be fed to and read aloud by a text-to-speech system, or be presented as Braille content. However, while appropriate for some uses and in some applications, OCR methods and systems employed in conventional video magnifiers have some drawbacks and limitations. For example, because the cameras employed in such video magnifiers generally have a relatively narrow field of view that can cover only a portion of a standard-paper-size document, OCR can only be performed on that portion of the document that is seen by the camera.

In view of the above considerations, there is therefore a need in the art for OCR methods and systems that can be used more easily and conveniently by low-vision individuals, while also alleviating at least some of the drawbacks of the prior art.

SUMMARY

In accordance with one aspect of the invention, there is provided a method for providing a text-based representation of a portion of a working area to a user. The method includes the steps of:

a) acquiring an image of the entire working area;
b) performing a fast OCR process on at least a region of interest of the image corresponding to the portion of the working area, thereby rapidly obtaining an initial machine-encoded representation of the portion of the working area, and immediately presenting the same to the user as the text-based representation;
c) in parallel to step b), performing a high-precision OCR process on at least the region of interest of the image, thereby obtaining a high-precision machine-encoded representation of the portion of the working area; and
d) upon completion of the high-precision OCR process, presenting the high-precision machine-encoded representation of the portion of the working area to the user as the text-based representation, in replacement of the initial machine-encoded representation.

In accordance with another aspect of the invention, there is provided a method for displaying a working area to a user. The method includes the steps of:

acquiring and displaying live video data of at least part of the entire working area;
monitoring a capture trigger parameter, and upon detection thereof, acquiring an image of the entire working area; and
providing to the user a text-based representation of a portion of the working area identified by the user, including:
performing a fast OCR process on at least a region of interest of the image corresponding to the portion of the working area, thereby rapidly obtaining an initial machine-encoded representation of the portion of the working area, and immediately presenting the same to the user as the text-based representation;
in parallel to the fast OCR process, performing a high-precision OCR process on at least the region of interest of the image, thereby obtaining a high-precision machine-encoded representation of the portion of the working area; and
upon completion of the high-precision OCR process, presenting the high-precision machine-encoded representation of the portion of the working area to the user as the text-based representation, in replacement of the initial machine-encoded representation.

In accordance with a further aspect of the invention, there is provided a system for providing a text-based representation of a portion of a working area to a user. The system includes:

a camera unit disposed over the working area and having an image sensor acquiring an image of the entire working area;

a processing unit receiving the image from the camera unit and including:

a fast OCR module for performing a fast OCR process on at least a region of interest of the image corresponding to the portion of the working area, thereby rapidly obtaining an initial machine-encoded representation of the portion of the working area;

a high-precision OCR module for performing a high-precision OCR process on at least the region of interest of the image, thereby obtaining a high-precision machine-encoded representation of the portion of the working area;

an output module initially outputting, as the text-based representation, the initial machine-encoded representation of the portion of the working area and replacing the same with the high-precision machine-encoded representation upon completion of the high-precision OCR process.

Other features and advantages of embodiments of the present invention will be better understood upon reading of preferred embodiments thereof with reference to the appended drawings.

BRIEF DESCRIPTION OF THE DRAWINGS

FIGS. 2A to 2J illustrate steps performed on an image by the fast and high-precision OCR processes, in accordance with an exemplary embodiment.

DETAILED DESCRIPTION

Figure 1A:
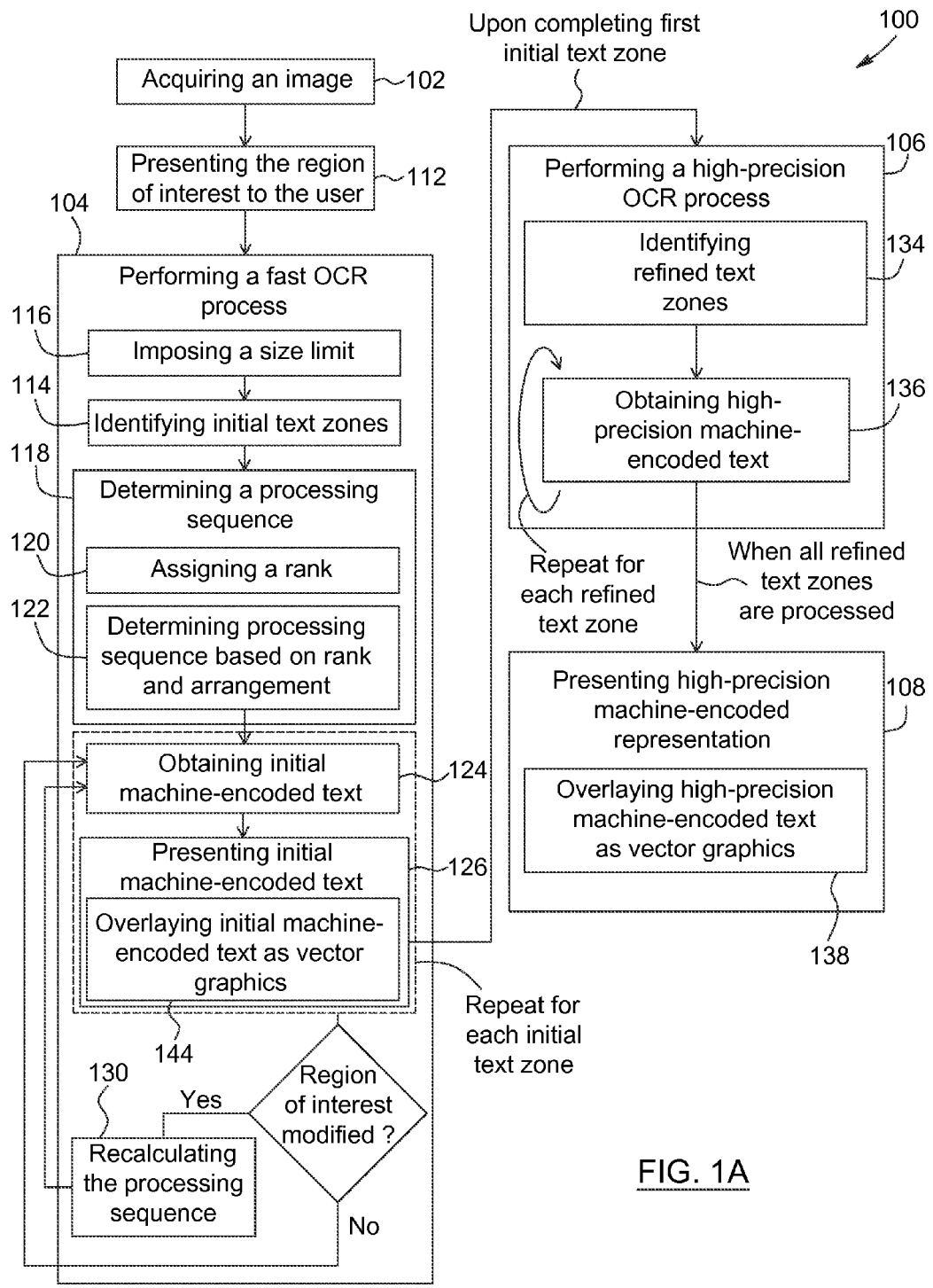
FIGS. 1A and 1B are flow charts of a method for providing a text-based representation of a portion of a working area to a user, in accordance with two exemplary embodiments.

In the following description, similar features in the drawings have been given similar reference numerals, and, in order to not unduly encumber the figures, some elements may not be indicated on some figures if they were already identified in preceding figures. It should also be understood herein that the elements of the drawings are not necessarily depicted to scale, since emphasis is placed upon clearly illustrating the elements and structures of the present embodiments.

The present description generally relates to a method and system for providing a text-based representation of a portion of a working area to a user, as well as to a method for displaying a working area to a user.

As will be described in greater detail below, embodiments of the present invention generally rely on the use of optical character recognition (OCR). Throughout the present description, the term "optical character recognition" and the corresponding acronym "OCR" are used to refer to the operation of performing image processing on an image to extract textual content therefrom. Optical character recognition generally involves processes and systems capable of translating images into machine-encoded text (e.g., ASCII or Unicode).

Embodiments of the present invention may be useful in any application where it is necessary or desirable to present, using OCR processes, textual content to individuals suffering from low vision or other visual impairments. In this regard, embodiments of the present invention may be of particular use in magnification systems such as the one illustrated in FIG. 3. An example of such a system is also described in U.S. patent application Ser. No. 13/724,896 entitled "Magnification system", the contents of which are incorporated herein by reference in their entirety.

Figure 3:
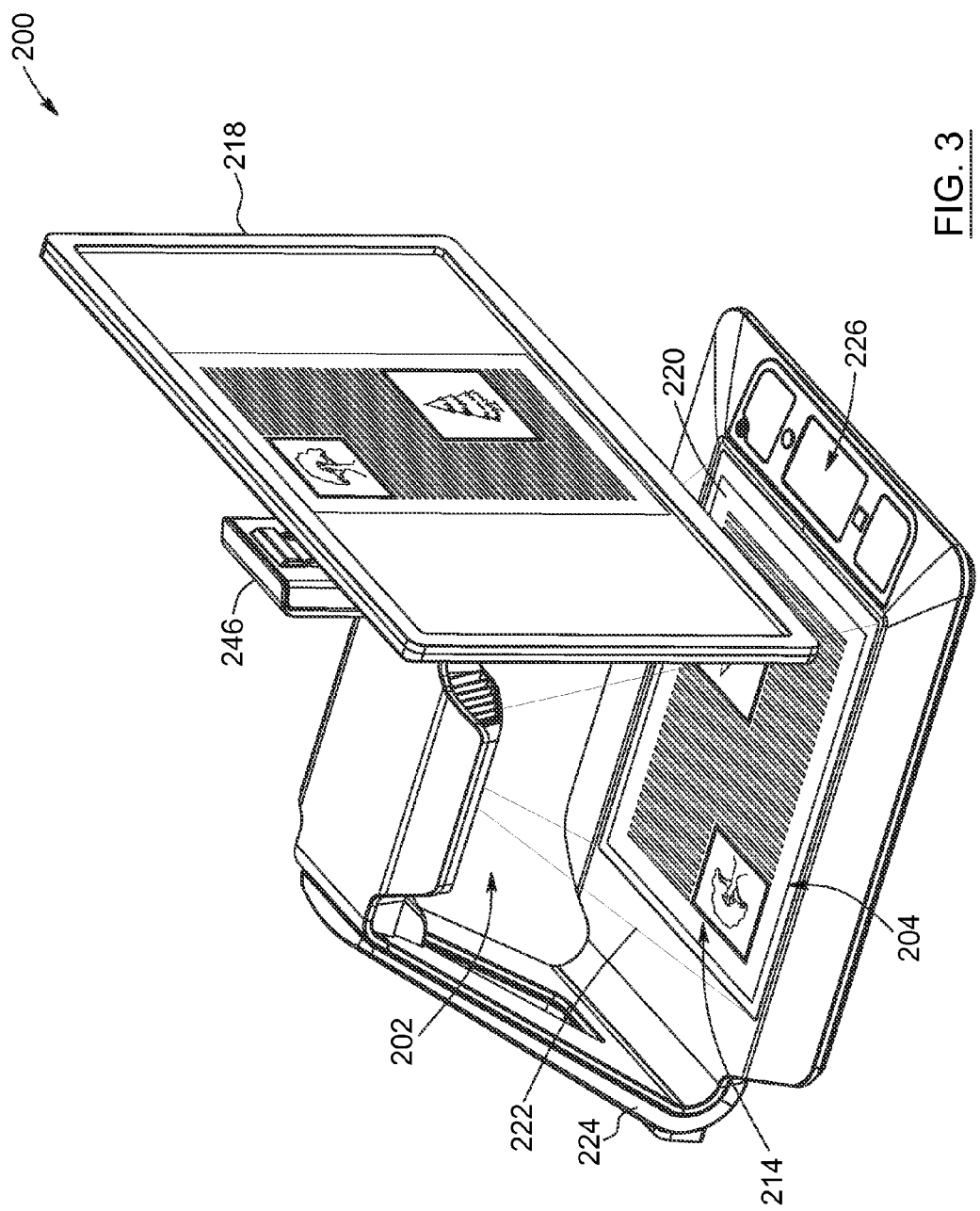
FIG. 3 is a perspective side view of a system for providing a text-based representation of a portion of a working area to a user, in accordance with an exemplary embodiment.

Broadly described, the exemplary system 200 of FIG. 3 includes a display unit 218 mounted on a frame structure 224. A camera unit 202 is mounted on the frame structure 224 and has a field of view 222 encompassing a working area 204. The working area 204 is typically a flat surface on which a user may place an object to be magnified or otherwise viewed on the display unit 218. For example, the object may be a document 220 the user wishes to read. The camera unit 202 acquires live video data of the document 220 disposed on the working area 204 and feeds the same to a video processor of the system 200. In turn, the video processor feeds this live video data to the display unit 218 where it can be displayed to the user. When used in connection with the exemplary system 200 of FIG. 3, embodiments of the present invention can involve acquiring a high-resolution image of the document 220 laid on the working area 204 using the camera unit 202, and subsequently performing OCR on the acquired image to extract textual content therefrom and generate a text-based representation of the document 220 that can be displayed to a user on the display unit 218.

As will be described in greater detail below, the methods and systems according to embodiments of the invention generally involve two independent OCR processes operating in parallel and characterized by specific and generally different processing speeds and accuracy rates. More particularly, one of the OCR processes, referred to as a "fast OCR process", aims at presenting a text-based representation of the portion of the working area to the user as quickly as possible, at the expense of potentially sacrificing some accuracy in the process. In contrast, the other OCR process, referred to as a "high-precision OCR process", aims at providing a text-based representation of the portion of the working area that is as accurate as possible, at the risk of sacrificing some speed. Once the high-precision OCR process is completed, the text-based representation obtained by the high-precision OCR process is presented to the user in replacement of the text-based representation previously obtained via the fast OCR process.

The output of an OCR process may be presented to a user according to various formats. As used herein, the term "text-based representation" generally refers to the form in which the machine-encoded text extracted using OCR is presented to the user. For example, as in the case of the system 200 shown in FIG. 3, the machine-encoded text extracted by OCR from the working area 204 may be presented to the user on a display unit 218. In such case, the text-based representation consists of suitably magnified text. Alternatively, the machine-encoded text could be presented to the user as synthesized speech or Braille.

As also used herein, the term "working area" is meant to encompass any physical structure or region having textual content thereon, or on which is disposed an object or objects having textual content thereon, wherein the textual content is to be extracted using OCR and presented to a user as a text-based representation. Typical objects may include, without being limited to, documents, books, newspapers, magazines, bills, checks, and three-dimensional objects such as pill bottles, labeled products or packages, and the like. In some embodiments, the working area may be a generally flat surface on which may be placed an object, for example a document containing printed, typewritten or handwritten text. Preferably, the working area has dimensions suitable to receive typical objects of which a user may wish to obtain a text-based representation in their entirety. One of ordinary skill in the art will understand that the terms "working area" and "object" are not intended to be restrictive.

It is to be noted that while some embodiments of the invention may be targeted to low-vision individuals, one of ordinary skill in the art will understand that embodiments of the invention could, in general, be used by any person desiring that textual content be extracted and presented to him or her in one way or another. More particularly, embodiments of the present invention can be of use to people who cannot or find it difficult to access printed text, including legally blind individuals and individuals with cognitive disabilities and/or learning disabilities.

Method for Providing a Text-Based Representation of a Portion of a Working Area to a User In accordance with one aspect of the invention, and with particular reference to FIGS. 1A to 2J, there is provided a method 100 for providing a text-based representation of a portion of a working area to a user.

Figure 1B:
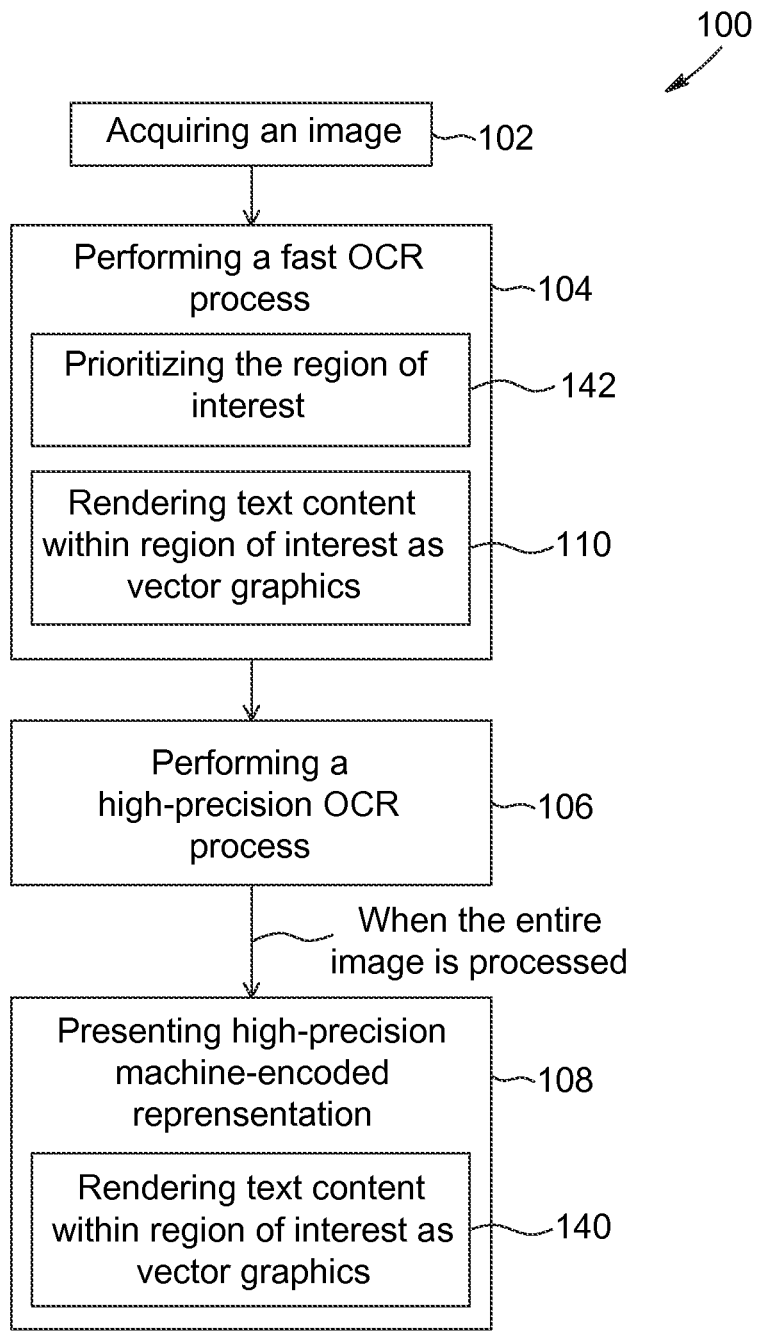

More particularly, FIGS. 1A and 1B show flow charts of two embodiments of the method 100, which can, by way of example, be performed with a system 200 such as the one illustrated in FIG. 3, or a similar system. Furthermore, FIGS. 2A to 2J illustrate processing steps of the fast and high-precision OCR processes according to an embodiment of the method. The two OCR processes are performed on an image 20 of the working area that includes textual content therein, such as shown in FIG. 3, so as to provide a text-based representation 24 of a portion of the working area. As in FIG. 3, the portion 214 of the working area 204 may correspond to the entire working area 204 or, alternatively, to a partial region thereof.

Broadly described, the method 100 illustrated in FIGS. 1A to 2J provides a text-based representation 24 of a portion of a working area to a user using OCR. As will be further described below, the method 100 first involves a step 102 of acquiring an image 20 of the entire working area (see, e.g., FIG. 2A), followed by a step 104 of performing a fast OCR process on at least a region of interest 26 of the image 20 corresponding to the portion of the working area (see, e.g., FIGS. 2B to 2H). The step 104 of performing the fast OCR process allows rapidly obtaining an initial machine-encoded representation 28 of the portion of the working area, and immediately presenting the same to the user as the text-based representation 24 (see, e.g., FIG. 2H). In parallel to the step 104 of performing the fast OCR process, the method 100 includes a step 106 of performing a high-precision OCR process on at least the region of interest of the image (see, e.g., FIGS. 2I and 2J), so as to obtain a high-precision machine-encoded representation 30 of the portion of the working area. Upon completion of the high-precision OCR process, the method finally includes a step 108 of presenting the high-precision machine-encoded representation 30 of the portion of the working area to the user as the text-based representation 24, in replacement of the initial machine-encoded representation 28 (see, e.g., FIG. 2J).

Figure 4:
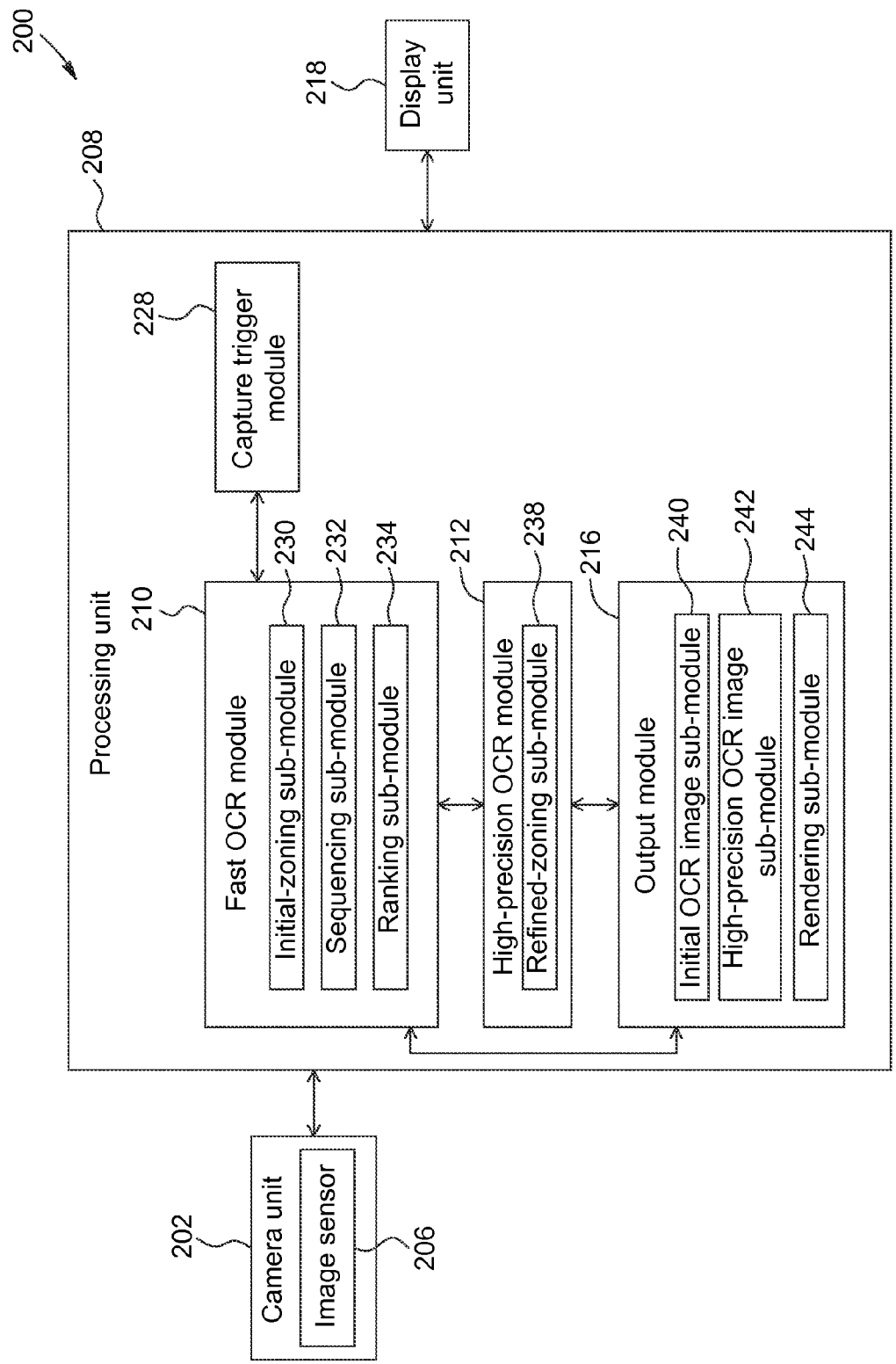
FIG. 4 is a schematic functional block diagram of a system for providing a text-based representation of a portion of a working area to a user, in accordance with an exemplary embodiment.

FIGS. 3 and 4 respectively provide a schematic perspective view and a schematic functional block diagram of an embodiment of a system 200 with which the method 100 may be performed. As described in greater detail below, the system 200 may include a camera unit 202 disposed over a working area 204 and provided with an image sensor 206 acquiring the image of the working area 204. The system 200 may also include a processing unit 208 for performing OCR on at least the region of interest of the image. In particular, the processing unit 208 may include fast and high-precision OCR modules 210 and 212 for respectively performing the fast and high-precision OCR processes and obtaining the initial and high-precision machine-encoded representations 28 and 30 (see FIGS. 2H and 2J) of the portion 214 of the working area 204. The processing unit 208 may also be provided with an output module 216 outputting one of the initial and high-precision machine-encoded representations 28 and 30 as the text-based representation 24 (see FIGS. 5 and 6, respectively). The system 200 may further include a display unit 218 for presenting to a user the text-based representation 24 output by the output module 216. Alternatively or additionally, the text-based representation can be presented to the user as synthesized speech or Braille.

Image Acquisition Process

Referring to FIGS. 1A to 4, the inspection method 200 first includes a step 102 of acquiring an image 20 of the entire working area 204.

Figure 2B:
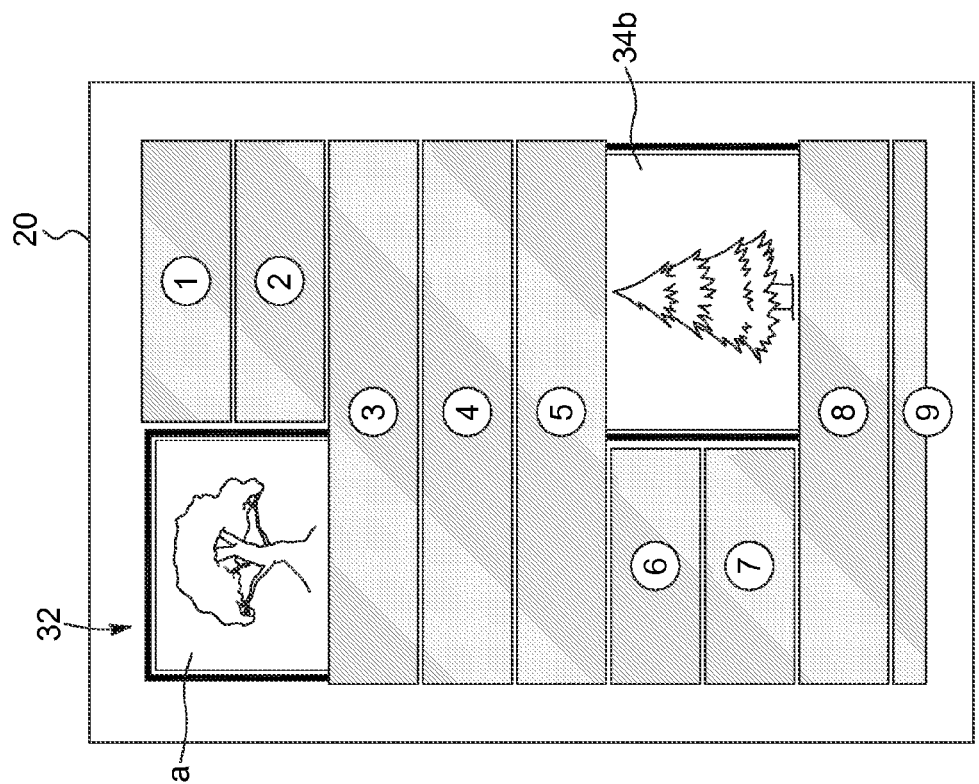
Figure 2A:
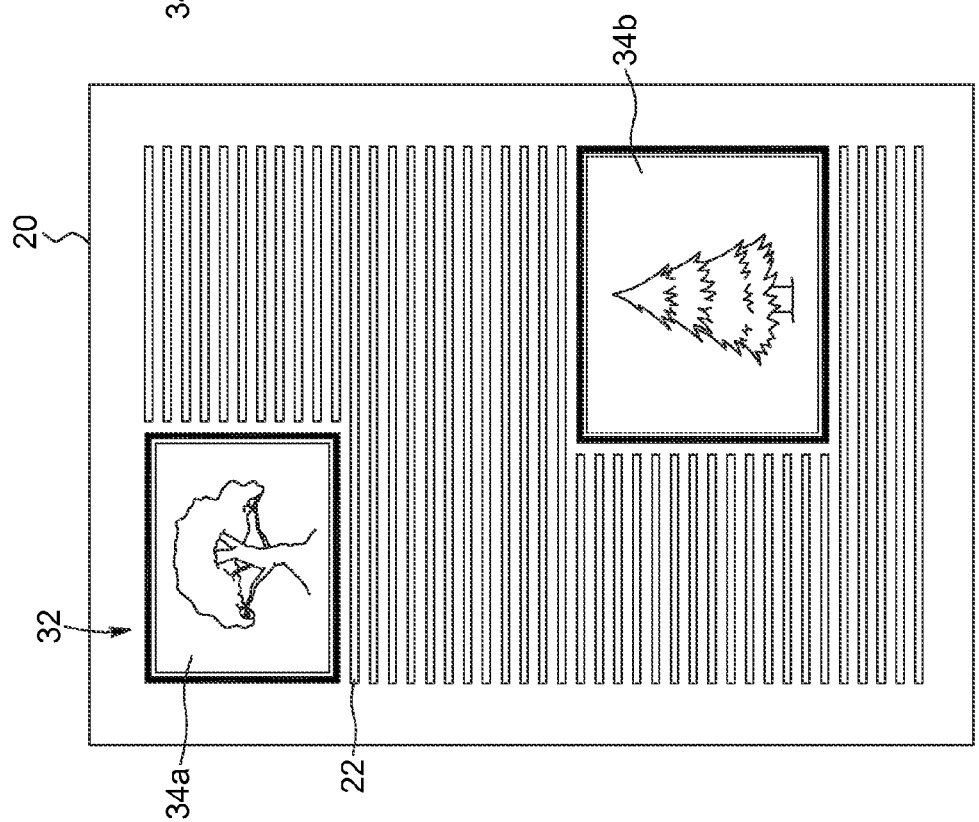

The image 20 is typically a bitmap image stored as an array of pixels, where each pixel includes color and brightness information for a particular location in the image 20. The image 20 of FIGS. 2A to 2H is an image of the document 220 placed on the working area 204 of FIG. 3. The document 220 may have a width and a length similar to or greater than standard paper sizes such as Letter (215.9 mm×279.4 mm), A3 (297 mm×420 mm), A4 (210 mm×297 mm), A5 (148 mm×210 mm), and the like. As shown in FIG. 2A, the bitmap image 20 may include both textual content 22 and non-textual content 32 such as, for example, pictures, tables, line graphics, and the like. It is to be noted that in the drawings, each line of textual content 22 in bitmap format is schematically represented by a thin elongated rectangular strip with unhatched interior. Furthermore, by way of example only, in the image of FIG. 2A, the non-textual content 32 of the image 20 includes a first picture 34*a* and a second picture 34*b*.

In some embodiments, the step 102 of acquiring the image 20 of the entire working area 204 includes acquiring the image 20 at a resolution of at least 2 megapixels. For example, in an exemplary embodiment, the high-resolution image 20 may have a resolution of 8 megapixels (e.g., 3264×2448 pixels) in RGBA format at 32 bits per pixel.

It will be understood that the image 20 of the entire working area 204 may be acquired using any appropriate optical imaging device or combination of devices apt to detect optical radiation emitted or reflected by the entire working area 204 and to use the same to generate the image 20 of the entire working area 204. For example, in FIG. 3, the working area 204 is a rectangular surface disposed so as to be entirely contained within the field of view 222 of the image sensor 206 of the camera unit 202.

As will be discussed below, it will be appreciated that acquiring the image of the entire working area at a high-resolution can advantageously allow a user to display, on a given display device, a specific area of interest of the image by zooming and panning over the array of pixels making up the image. Therefore, by acquiring the image of the entire working area, embodiments of the invention can spare a user from having to rely on optical zooming and from having to physically move the working area relative to the field of view of the image in order to display a specific area of interest.

Fast OCR Process

Referring back to FIG. 1A, the method 100 then includes a step 104 of performing a fast OCR process on at least a region of interest 26 of the image 20 (see, e.g., FIGS. 2C to 2G) corresponding to the portion 214 of the working area 204 in FIG. 3. The step 104 of performing the fast OCR process allows rapidly obtaining an initial machine-encoded representation 28 of the portion of the working area (see, e.g., FIG. 2H).

Once obtained, the initial machine-encoded representation 28 is immediately presented to the user as the text-based representation 24. For example, the text-based representation 24 may be visually displayed to the user as suitably magnified text. In some embodiments, presenting the initial machine-encoded representation 28 of the portion 214 of the working area 204 to the user as the text-based representation 24 includes rendering 110 the textual content 22 within the region of interest 26 as vector graphics 36, as shown in FIGS. 1B and 2H. Alternatively, the text-based representation 24 may be presented to the user as synthesized speech or Braille. Optionally, the method 100 may further include a step 112 of displaying the region of interest 26 to the user between the steps of acquiring 102 the image of the entire working area and performing 104 the fast OCR process.

It will be understood that the fast OCR process may be embodied by any appropriate optical character recognition technique or algorithm, or combination thereof, capable of extracting textual content from an input image with suitable speed and accuracy. As used herein, the term "fast" when referring to the fast OCR process is intended to imply that the fast OCR process is performed with the aim of reducing the amount of time required to perform OCR, that is, to scan, recognize and present to the user textual content in the region of interest 26. Preferably, the speed of the fast OCR process is fast enough that the user does not perceive having to wait for the initial machine-encoded representation 28 to be presented to him or her. Additionally, while the accuracy rate of an OCR process is generally an inverse function of its speed, the use of the term "fast" in regard to the fast OCR process should not be construed as implying that the fast OCR process is necessarily of a lower precision than the high-precision OCR process described below. In one example, the fast optical recognition process may be performed by a Fire Worx (trademark) OCR engine from the company Nuance, or other similar software.

Throughout the present description, the term "region of interest" refers to a part of the image of the working area (e.g., an area in pixels×pixels of the image) that contains information of interest to a user. More specifically, the region of interest corresponds to the portion of the working area whose text-based representation is to be provided to a user by performing the method according to embodiments of the invention. As seen in FIGS. 2C to 2G and 2I, in the drawings, the region of interest 26 is outlined by a thick solid-line rectangle. However, the region of interest 26 may assume other shapes in other embodiments. In some embodiments, the region of interest 26 may be visually displayed to a user on a monitor at a desired magnification level. It will be understood that while in the illustrated embodiments the region of interest 26 corresponds to a fraction of the image 20, in other embodiments the region of interest 26 may correspond to the entire image 20 of the working area.

Identification of the Initial Text Zones

In embodiments where the fast OCR process is to be performed on more than the region of interest 26 of the image 20, for example on the entire image 20 of FIG. 2A, the step 104 of performing the fast OCR process is preferably carried out by processing 142 the region of interest in a prioritized manner, as shown in FIG. 1B.

As used herein, the term "prioritized manner" is meant to indicate that the fast OCR process treats all or part of the textual content inside the region of interest before, more rapidly and/or with more processing resources than other textual content in the image. In this manner, the initial machine-encoded representation of the portion of the working area corresponding to the region of interest can be presented to the user as quickly as possible.

Referring to FIG. 1A, performing 104 the fast OCR process may include a first preliminary substep 114 of identifying initial text zones within the image, wherein each initial text zone includes textual content in bitmap format. In the drawings, the initial text zones are represented as cross-hatched rectangles with uniform hatching (see, e.g., initial text zones 1 to 9 in FIGS. 2B and 2C).

As used herein, the term "bitmap" or "raster graphics" refers to pixel-based graphics, wherein images are represented as a collection of pixels, generally in the form of a rectangular array. As known in the art, bitmap graphics are resolution-dependent and cannot be scaled up to an arbitrary size without sacrificing a degree of apparent image quality. This term is typically used in contrast to the term "vector graphics", which are resolution-independent and can thus be readily represented at any desired resolution.

The image 20 of FIG. 2A may be analyzed to identify therein initial text zones. In some embodiments, the substep 114 in FIG. 1A of identifying the initial text zones be preceded by an optional substep of imposing 116 a size limit on the initial text zones. For example, in FIG. 2B, each initial text zone, labeled as 1 to 9, includes a maximum of five lines of text. It will be understood, as discussed in greater detail below, that imposing a maximum size on the initial text zones 1 to 9 can reduce the time involved to complete the fast OCR process on the initial text zones located within or overlapping the region of interest 26 of the image 20 (see, e.g., initial text zones 2, 3 and 4 in FIG. 2C).

Determination of the Processing Sequence of the Initial Text Zones

Referring back to FIGS. 1A to 2H, the preliminary substep 114 of identifying the initial text zones 1 to 9 may be followed by a preliminary substep 118 of determining a processing sequence for performing the fast OCR process on the initial text zones 1 to 9. In one possible embodiment the initial text zones 1 to 9 may simply be processed sequentially, for example from the top to the bottom of the page, that is, in the order 1, 2, 3, 4, 5, 6, 7, 8, and then 9. In other embodiments, the processing sequence may be based on an arrangement of the initial text zones 1 to 9 with respect to the region of interest 26. In still other embodiments the sequence may be determined in a dynamic manner.

As mentioned above, the processing sequence preferably allows the processing of the region of interest in a prioritized manner. In turn, this ensures that at least part of the initial machine-encoded representation of the portion of the working area corresponding to the region of interest is presented to the user as quickly as possible, thus easing reading of the document by the user. For example, in some embodiments, only one initial text zone may intersect the region of interest such that OCR is to be performed on this single initial text zone in a prioritized manner. In other embodiments, the region of interest may be intersected by more than one text initial zone. In such a case, one or more of these initial text zones may be given priority. For example, each one of the initial text zones intersecting the region of interest may be treated in a prioritized manner. Alternatively, priority may be given to only one of the initial text zones intersecting the region of interest, for example the highest-ranked of the initial text zones intersecting the region of interest.

A first exemplary, non-limiting set of priority rules for determining the processing sequence for performing the fast OCR process on the initial text zones 1 to 9 will now be described, with reference to FIGS. 1A to 2H. Of course, the processing sequence according to which the initial text zones 1 to 9 are processed could be determined based on a different set of priority rules.

The substep 118 of determining a processing sequence for performing the fast OCR process may first involve assigning 120 a respective sequential rank to each initial text zone 1 to 9. The ranking according to which the initial text zones 1 to 9 are ordered may follow rules which are representative of the overall arrangement of the document 220, as illustrated in FIG. 2B. In other words, the initial text zones 1 to 9 may be ranked in the order according to which a user would normally or logically read the document 220. More specifically, in FIGS. 2B and 2C, initial text zone 1 corresponds to the first paragraph of the document 220; initial text zone 2 corresponds to the second paragraph of the document 220; and so on. However, it will be understood that the embodiments of the invention are not limited to a particular rule or rules for ranking the initial text zones 1 to 9.

In FIG. 2, the ranking of the initial text zones 1 to 9 is performed by considering the arrangement of the initial text zones 1 to 9 within the image 20, without having regard to the position and size of the region of interest 26. Therefore, the ranking of the initial text zones 1 to 9 may, but need not, correspond to the processing sequence for performing the fast OCR process.

Once the initial text zones 1 to 9 have been ranked according to a particular ranking rule, the substep 118 of determining a processing sequence for performing the fast OCR process may next involve determining 122 the processing sequence based, on the one hand, on the sequential ranks respectively assigned to the initial text zones 1 to 9 and, on the other hand, on the arrangement of the initial text zones 1 to 9 with respect to the region of interest 26.

In FIG. 2C, the size of the region of interest 26 and the position thereof within the image 20 is dynamically calculated. The position and size of the region of interest 26 may be established, for example, by receiving panning and zooming instructions from the user. Once the position and size of the region of interest 26 has been assessed, each initial text zone 1 to 9 intersecting the region of interest 26 may be identified. In the illustrated example, as shown in FIG. 2C, zones 2, 3 and 4 are so identified. The substep 118 of determining the processing sequence may then be performed according to the following exemplary set of priority rules.

1) The first set of initial text zones to be processed corresponds to the initial text zones that intersect the region of interest in order to prioritize fast OCR processing on the portion of the printed document that is presented to the user.

In FIG. 2C, the first set of initial text zones is made up of initial text zones 2, 3 and 4. These three zones will be processed according to their ranking, that is, initial text zone 2, followed by initial text zone 3 and followed by initial text zone 4.

2) The second set of initial text zones to be processed corresponds to the initial text zones that do not intersect the region of interest but whose sequential rank is between the sequential rank of the highest-ranked initial text zone intersecting the region of interest and the lowest-ranked initial text zone intersecting the region of interest.

In FIG. 2C, the highest-ranked initial text zone intersecting the region of interest 26 is initial text zone 2, while the lowest-ranked initial text zone intersecting the region of interest 26 is initial text zone 4. The only initial text zone ranked between the highest-ranked and the lowest-ranked initial text zones 2 and 4 intersecting the region of interest 26 is initial text zone 3. As initial text zone 3 intersects the region of interest 26 and is already part of the first set of initial text zones, the second set of initial text zones is thus empty in the scenario of FIGS. 2B and 2C.

Figure 9:
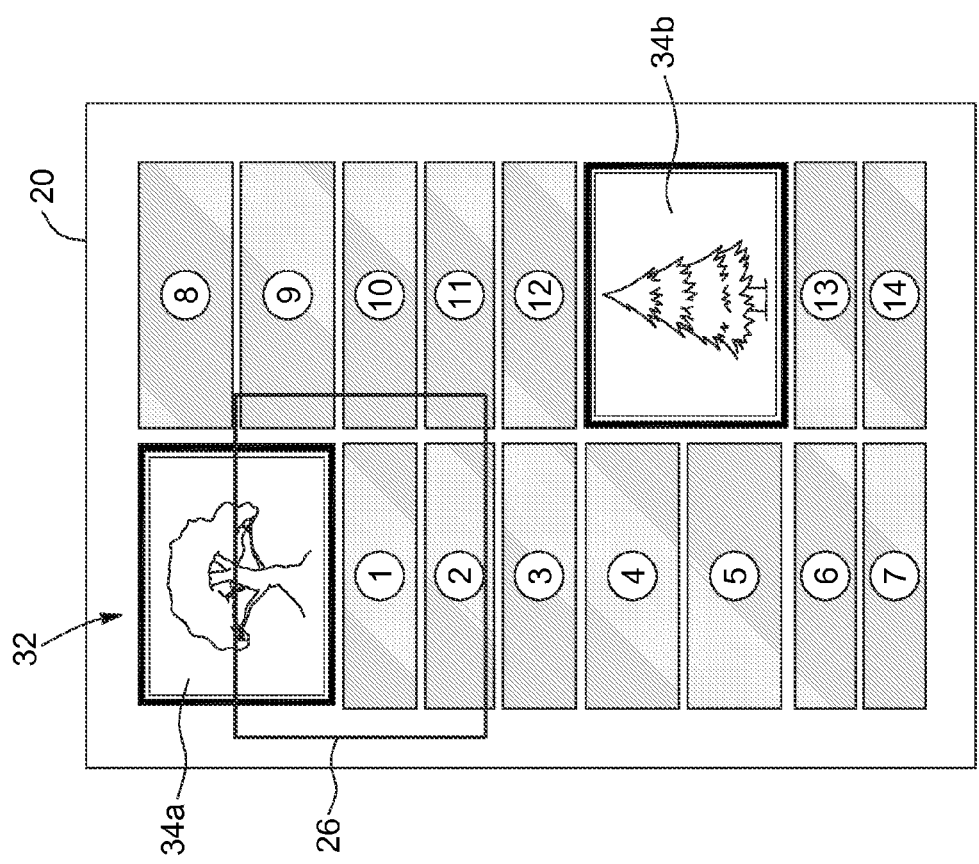
FIG. 9 illustrates another example of an image on which a method for providing a text-based representation of a portion of a working area to a user can be performed.

In another embodiment, one or more initial text zones could be placed in the second set of initial text zones. Referring to FIG. 9, in another example of an image 20 on which the method of FIG. 1A can be performed, the first set of initial text zones intersecting the region of interest 26 are initial text zones 1, 2, 9, 10 and 11. The highest-ranked and lowest-ranked initial text zones in the first set of initial text zones are respectively initial text zones 1 and 11, so that the second set of initial text zones includes initial text zones 3 to 8. The initial text zones 3 to 8 are placed in the processing sequence immediately after the first set of initial text zones 1, 2, 9, 10 and 11, and ordered according to their rank: initial text zone 3, followed by initial text zone 4, and so on through initial text zone 8

3) The third set of initial text zones to be processed corresponds to the initial text zones whose sequential rank is below the lowest-ranked initial text zone intersecting the region of interest.

In FIG. 2C, the lowest-ranked initial text zone intersecting the region of interest 26 is initial text zone 4. The initial text zones ranked below the initial text zone 4 are initial text zones 5 to 9, which will be processed according to their ranking. Likewise, in FIG. 9, the lowest ranked initial text zone intersecting the region of interest 26 is initial text zone 11. The initial text zones ranked below initial text zone 11 and included in the third set of initial text zones are thus initial text zones 12 to 14. The initial text zones 12 to 14 are placed in the processing sequence immediately after the initial text zones 3 to 8, and are ordered according to their rank: initial text zone 12, followed by initial text zone 13, and followed by initial text zone 14

4) The fourth set of initial text zones to be processed corresponds to the initial text zones whose sequential rank is above the highest-ranked initial text zone intersecting the region of interest.

In FIG. 2C, the highest-ranked initial text zone intersecting the region of interest 26 is initial text zone 2. The only initial text zone ranked above the initial text zone 2 is initial text zone 1. Likewise, in FIG. 9, the highest-ranked of the initial text zones intersecting the region of interest 26 is initial text zone 1, such that there are no text zone ranked above below initial text zone 1 and thus no initial text zone in the fourth set of initial text zones in this example.

In summary, for the image 20 and the region of interest 26 illustrated in FIG. 2C, the initial text zones may be treated according to the following processing sequence: 2, 3, 4, 5, 6, 7, 8, 9 and 1. Likewise, for the text zone arrangement and the region of interest 26 of the image 20 illustrated in FIG. 9, the initial text zones 1 to 14 can be ordered according to the following OCR processing sequence: 1, 2, 9, 10, 11, 3, 4, 5, 6, 7, 8, 12, 13 and 14.

As mentioned above, the set of priority rules described above is provided for illustrative purposes only, such that in other embodiments, the processing sequence can be established according to different sets of priority rules. In a second example, and referring back to FIG. 1A, the substep 118 of determining the processing sequence can include placing a highest-ranked initial text zone intersecting the region of the beginning of the processing sequence. This highest-ranked initial text zone intersecting the region of interest is thus treated in a prioritized manner compared to the other initial text zones.

In FIG. 2C, the initial text zones intersecting the region of interest 22 are initial text zones 2, 3 and 4. The highest-ranked initial text zone among these three initial text zones is initial text zone 2, which is thus placed at the beginning of the processing sequence. Similarly, in FIG. 9, the initial text zones intersecting the region of interest 26 are initial text zones 1, 2, 9, 10 and 11. The highest-ranked of these five initial text zones is text zone 1, which is thus placed at the beginning of the processing sequence.

Referring back to FIG. 1A, the substep 118 of determining the processing sequence can also include placing, immediately after the highest-ranked initial text zone intersecting the region of interest, any initial text zone that is ranked below this highest-ranked initial text zone. If more than one such initial text zone is identified, they are ordered in the processing sequence according to their ranking.

For example, in FIG. 2C, the initial text zones that are ranked below the highest-ranked initial text zone intersecting the region of interest 26, that is, initial text zone 2, are initial text zones 3 to 9. These initial text zones are thus placed immediately after initial text zone 2 in the processing sequence and are ordered according to their ranking: initial text zone 3, followed by initial text zone 4, and so on through initial text zone 9. In FIG. 9, the initial text zones that are ranked below the highest-ranked text zone intersecting the region of interest 26, that is, initial text zone 1, are initial text zones 2 to 14. These initial text zones are thus placed immediately after initial text zone 1 in the processing sequence and are ordered according to their ranking: initial text zone 2, followed by initial text zone 3, and so on through initial text zone 14.

Referring back to FIG. 10, the substep 118 of determining the processing sequence can finally include placing, at the end of the processing sequence, any initial text zone that is ranked above the highest-ranked initial text zone intersecting the region of interest. If more than one such initial text zone is identified, they are ordered at the end of the processing sequence according to their ranking.

In FIG. 2C, only initial text zone 1 is ranked above the highest-ranked initial text zone intersecting the region of interest 26, that is, initial text zone 2. Initial text zone 1 is thus placed at the end of the processing sequence. In FIG. 9, no initial text zone is ranked above the highest-ranked initial text zone intersecting the region of interest 26 since this highest-ranked initial text zone corresponds to initial text zone 1.

In summary, according to the second exemplary set of priority rules, the initial text zones in FIG. 2C can be ordered according to the following processing sequence: 2, 3, 4, 5, 6, 7, 8, 9 and 1. In FIG. 9, the second exemplary set of priority rules leads to the following processing sequence: 1, 2, 3, 4, 5, 6, 7, 8, 9, 10, 11, 12, 13 and 14.

Fast OCR Process on the Initial Text Zones According to the Processing Sequence and Text Overlay Referring back to FIGS. 1A to 2H, once the preliminary substeps of identifying 118 the initial text zones 1 to 9 and determining 120 the processing sequence for performing the fast OCR process are completed, obtaining the initial machine-encoded representation 28 of the portion 214 of the working area 204 may include obtaining 124 initial machine-encoded text 36 corresponding to the textual content 22 of each initial text zone 1 to 9. This may be achieved by performing the fast OCR process on the initial text zones 1 to 9 according to the processing sequence.

As the initial machine-encoded representation of the portion of the working area is progressively obtained, the machine-encoded representation is also immediately or concurrently presented 126 to the user. By the terms "immediately" and "concurrently", it is meant that as OCR is performed on the initial text zones to progressively obtain the initial machine-encoded representation of the portion of the working area, the initial machine-encoded representation is at the same time progressively presented to the user. For example, in scenarios where the text-based representation is an audio or Braille output, the machine-encoded representation can be presented to the user as smoothly and consistently as possible to provide a satisfactory user experience. In scenarios where the text-based representation is visually displayed to the user (e.g., as suitably magnified text), the text-based representation presented to the user can be updated or refreshed every time the textual content of an additional one of the initial text zones is recognized and added to the machine-encoded representation of the region of interest.

It is to be noted that in FIGS. 2D to 2H, each line of initial machine-encoded text 36 is schematically represented by a thin elongated rectangular strip with uniformly cross-hatched interior.

In one embodiment, the step of presenting 126 of the initial machine-encoded text may be done according to the following sequence:

1. The entire bitmap of the page is erased and replaced by a background bitmap having a single and uniform color. This color may be system-defined or selected by the user, and may for example take under consideration optimized parameters for a low-vision condition of the user, user preferences or both.
2. Non-textual content, such as the first and second pictures 34a, 34b in the illustrated example is redrawn on the background bitmap.
3. As the processing on the initial text zones according to the processing sequence is performed, lines of each initial text zone are displayed one line at a time as vector graphics over the background bitmap, each line being preferably displayed in a single and uniform text color. As with the background color, the text color may be system-defined or selected by the user, and may for example take under consideration optimized parameters for the low-vision condition of the user, user preferences or both.

As will be readily understood by one of ordinary skill in the art, depending on the user's eye condition, certain text and background color combinations may improve the ease of reading. The overlay of the initial machine-encoded text described above can allow for the user to read text using an optimal text and background color combination. It is to be noted that this optimal text and background color combination can be displayed independently of the text color or the background color of the original bitmap.

Alternatively, in FIG. 1A, presenting the initial machine-encoded representation 28 of the portion 214 of the working area 204 to the user includes overlaying 144 the initial machine-encoded text 36 of each initial text zone 1 to 9 in the image 20 as vector graphics over on the respective bitmap textual content 22, as shown in and 2D to 2H.

It will also be understood that in order to present the initial machine-encoded representation 28 of the portion of the working area to the user as quickly as possible, presenting 126 the initial machine-encoded text 36 for a given initial text zone can be completed before commencing the step of obtaining 124 the initial machine-encoded text 36 corresponding to the next initial text zone in the processing sequence. For example, the initial machine-encoded text 36 of initial text zone 2 is displayed on the image 20 (see FIG. 2D) before commencing the fast OCR process on initial text zone 3 (see FIG. 2E).

Modification in the Size or Position of the Region of Interest

Figure 2E:
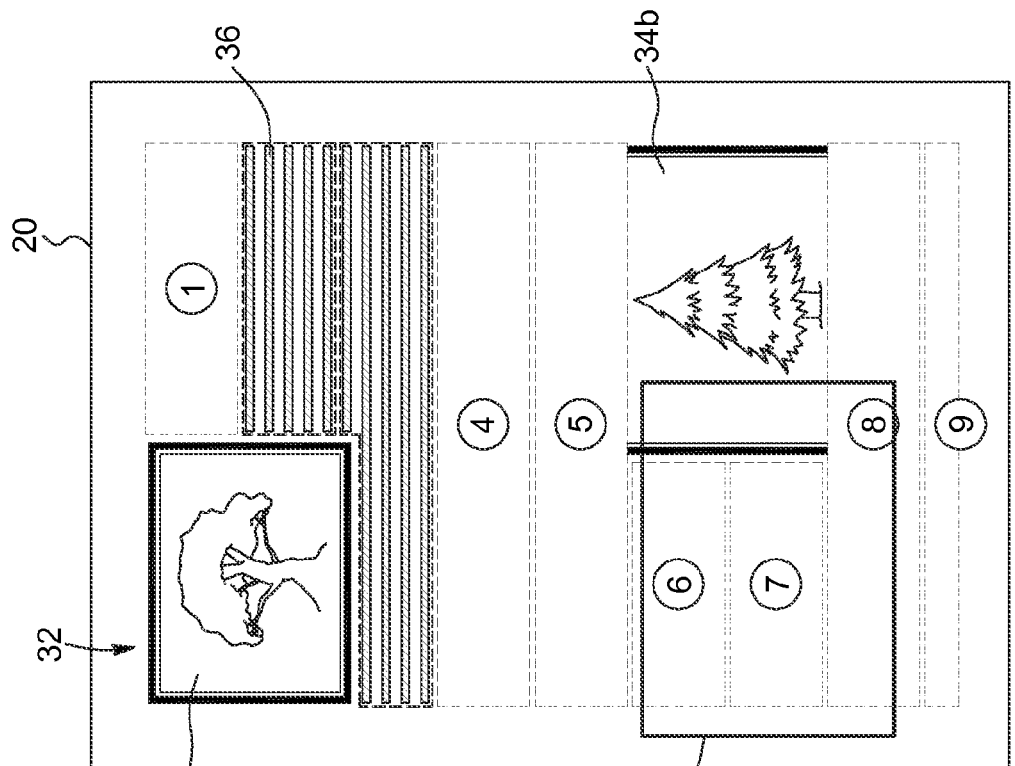
Figure 2F:
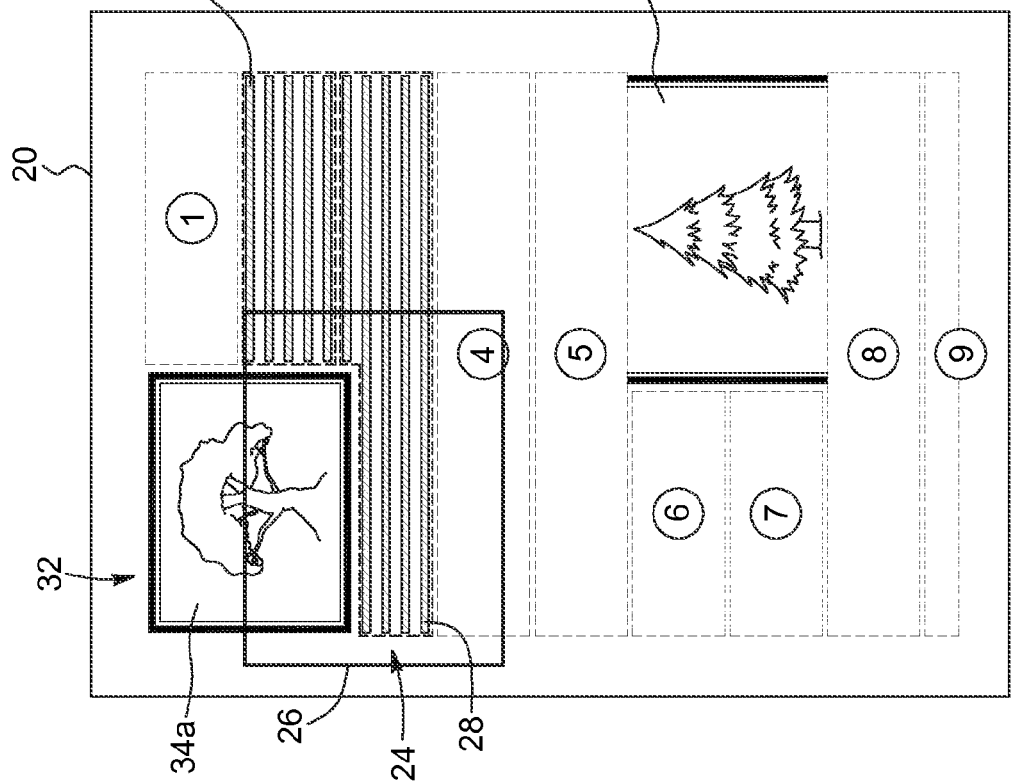

In some embodiments, the user may wish to change the size or position of the region of interest while the fast OCR process is being performed on the initial text zones. FIGS. 2E to 2G illustrate the effect of modifying the position of the region of interest 26 while the step 124 of obtaining the initial machine-encoded text is being performed on initial text zone 3.

It will be understood that, in practice, the modification of the region of interest may take at certain time (e.g., a few seconds) to be completed if, for example, the user pans the region of interest 26 from the top to the bottom of the image 20. Once the new position and size of the region of interest 26 has been assessed, the method 100 of FIG. 1A preferably include a step 130 of recalculating the processing sequence of unprocessed ones of the initial text zones 1 to 9 (e.g., initial text zones 1 and 4 to 9 in FIG. 2F) based on the arrangement of the initial text zones 1 to 9 with respect to the new region of interest 26. If the region of interest 26 is modified while the fast OCR process is performed on a given initial text zone (e.g., the initial text zone 3 in FIG. 2E), the fast OCR process may be completed before recalculating the processing sequence.

Referring to FIG. 2F, it is seen that the new region of interest 26 now intersects initial text zones 6, 7 and 8. Accordingly, applying the first exemplary set of priority rules described above, the processing sequence of the initial text zones 1 and 4 to 9 that are left to processed will be changed from "4, 5, 6, 7, 8, 9 and 1" to "6, 7, 8, 9, 1, 4 and 5". In other words, following the modification of the region of interest 26, the steps 124 and 126 of obtaining and displaying the initial machine-encoded text 36 will be performed on the initial text zones 6, 7 and 8 in a prioritized manner, as initial text zones 6, 7 and 8 now intersects the region of interest 26.

Referring to FIG. 2H, once the steps 124 and 126 of obtaining and displaying the initial machine-encoded text 36 are completed for all the initial text zones 1 to 9, the entire bitmap textual content 22 contained in the image 20 will have been replaced by vector graphics. However, non-textual content 32 such as the first and second pictures 34a, 34b may still be presented in their original bitmap format. It will be understood that, in some embodiments, the user may be able to toggle between the text-based representation 24 and the bitmap textual content 22 of the image 20 at any time during the steps 124 and 126 of obtaining and displaying the initial machine-encoded text 36, for example if the text-based representation 24 contains too many OCR mistakes.

Figure 5:
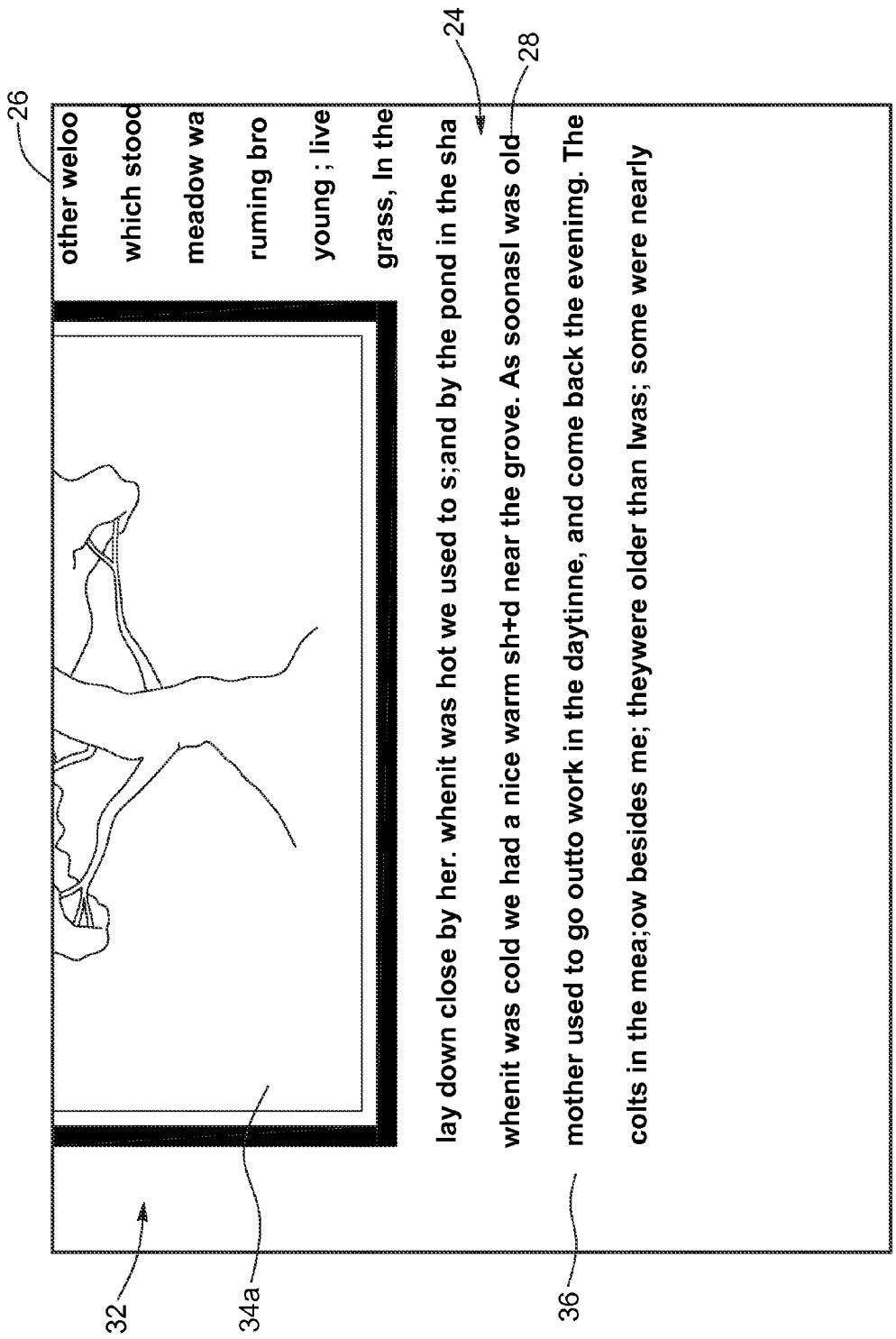
FIG. 5 is a view of the text-based representation of the portion of the working area that is presented to a user after the processing step of FIG. 2E is completed, in accordance with an exemplary embodiment.

FIG. 5 shows an example of the image that could be presented to the user during the fast OCR process, for example at the stage presented in FIG. 2E after initial text zones 2 and 3 have been processed but before the processing of initial text zone 4. In this example, the text of initial text zones 2 and 3 which is encompassed in the region of interest 26 is shown to the user as vector graphics. As this text results from a fast OCR process which is optimized to favor speed over precision, this text may include some slight mistakes, omissions and typographical errors. The region where the text of initial text zone 4 would normally appear may be left empty while the fast OCR process is still running on that text zone.

High-Precision OCR Process

Figure 2J:
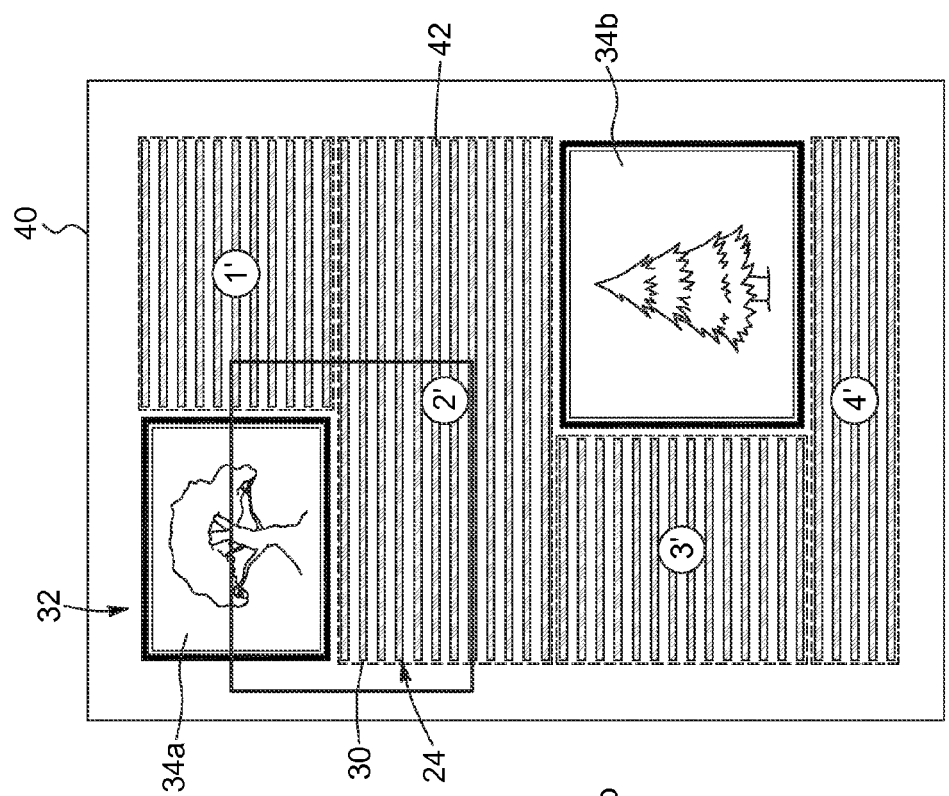
Figure 2I:
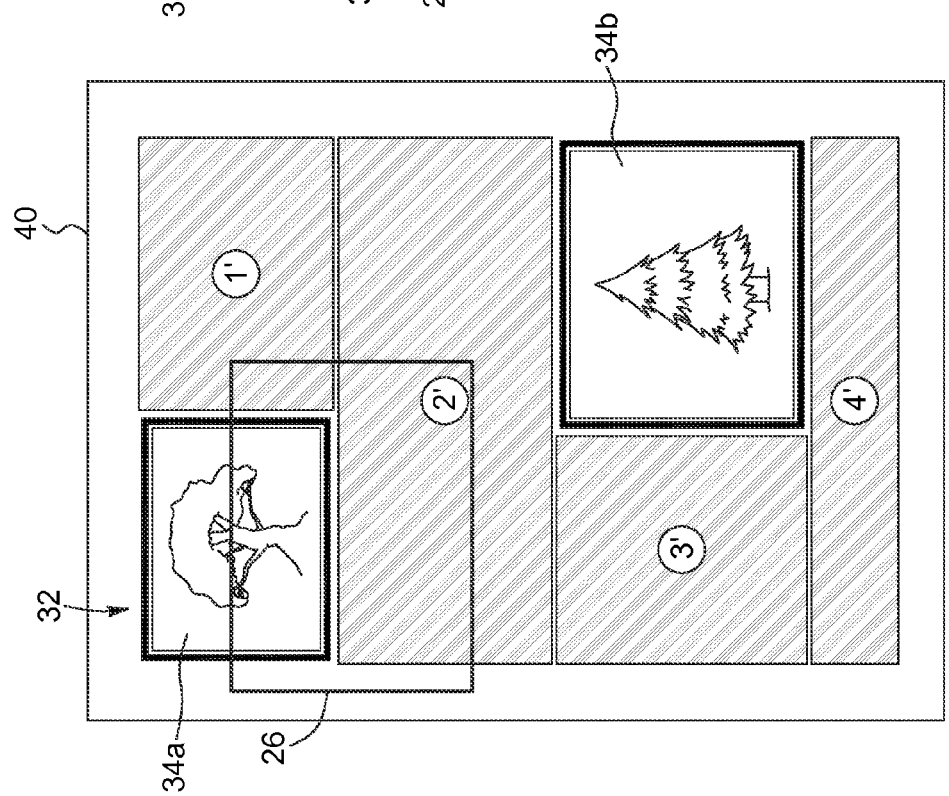

Referring back to FIG. 1A, the method 100 further includes a step 106 of performing a high-precision OCR process on at least the region of interest 26 of the image 20 (see, e.g., FIGS. 2I and 2J). The step 106 of performing the high-precision OCR process allows obtaining a high-precision machine-encoded representation 30 of the portion of the working area (see, e.g., FIG. 2J).

As for the fast OCR process described above, the high-precision OCR process may be embodied by any appropriate optical character recognition technique or algorithm, or combination thereof, capable of extracting textual content from an input image with suitable speed and accuracy. As used herein, term "high-precision" when referring to the high-precision OCR process is intended to imply that the high-precision OCR process is performed with the aim of obtaining a machine-encoded representation of the portion of the working area that is as accurate and precise as possible. In one example, the high-precision recognition process may be performed by the 2-Way Voting (trademark) OCR engine from the company Nuance, or other similar software. While the accuracy rate of an OCR process is generally an inverse function of its speed, the use of the term "high-precision" in regard to the fast OCR process should not be construed as implying the high-precision OCR process is necessarily significantly slower than the fast OCR process described below.

Still referring to FIG. 1A, in embodiments of the present invention, the step 106 of performing the high-precision OCR process is carried in parallel to the step 104 of performing the fast OCR process. As used herein, the term "in parallel" is intended to mean that the fast and high-precision OCR processes are to be performed within the same time span, but does not necessarily imply synchronization or perfect overlap in time. More specifically, the term "in parallel" generally means that the high-precision OCR process begins at least before the fast OCR process is completed.

In some embodiments the high-precision OCR process may be given a lower priority than the fast OCR process. In one example, in order to present the initial machine-encoded representation of the portion of the working area to the user as quickly as possible, the high-precision OCR process 106 in FIG. 1A may begin only after the step of presenting 126 the initial machine-encoded text to the user is completed for the first initial text zone 1 to 9 in the processing sequence (e.g., initial text zone 2 in FIG. 2D).

Identification of the Refined Text Zones

In some embodiments, at a suitable moment in time a request may be sent to begin performing 106 the high-precision OCR process. Preferably, the high-precision OCR process is performed on more than the region of interest 26 of the image 20, for example on the entire image 20, as in FIGS. 2I and 2J.

Performing 106 the high-precision OCR process may include a first substep 134 of identifying refined text zones within the image, wherein each refined text zone includes textual content in bitmap format. In the embodiment of FIGS. 2I and 2J, the refined text zones in the image 20 are labeled as 1' to 4' and are represented as cross-hatched rectangles with non-uniform hatching.

Referring to FIG. 2I, the image 20 of the entire working area 204 may be analyzed to identify therein the refined text zones 1' to 4'. In contrast to the initial text zones 1 to 9 shown in FIG. 2B, it may not be desirable to impose a constraint on the size of the refined text zones 1' to 4' as a way of minimizing processing time. This is mainly because the high-precision machine-encoded representation 30 of the portion 214 of the working area 204 (see FIG. 3) will only be presented to the user once the high-precision OCR process is completed for all the refined text zones 1' to 4'. Therefore, in some embodiments, only one refined text zone could be defined, without departing from the scope of the invention. Preferably, the refined text zones 1' to 4' are sized and shaped so as not to overlap with the non-textual content 32 in the image 20. Further preferably, it will be understood that the number, size and arrangement of the refined text zones 1' to 4' may generally differ from those of the initial text zones 1 to 9.

High-Precision OCR Process on the Refined Text Zones

Referring back to FIGS. 2I and 2J, once the refined text zones 1' to 4' have been identified, the step 106 of performing the high-precision OCR process in FIG. 1A may include a substep of obtaining 136 high-precision machine-encoded text 42 corresponding to the textual content of each refined text zone 1' to 4' by performing the high-precision OCR process on the refined text zones 1' to 4', preferably in a sequential manner. In this regard, and in contrast to the fast OCR process, the refined text zones 1' to 4' will generally not benefit from being processed according to a particular processing sequence since the high-precision machine-encoded text 42 of the refined text zones 1' to 4' will only be presented to the user once the high-precision OCR process is completed for all the refined text zones 1' to 4'.

Replacement of the Text-Based Representation

Figure 6:
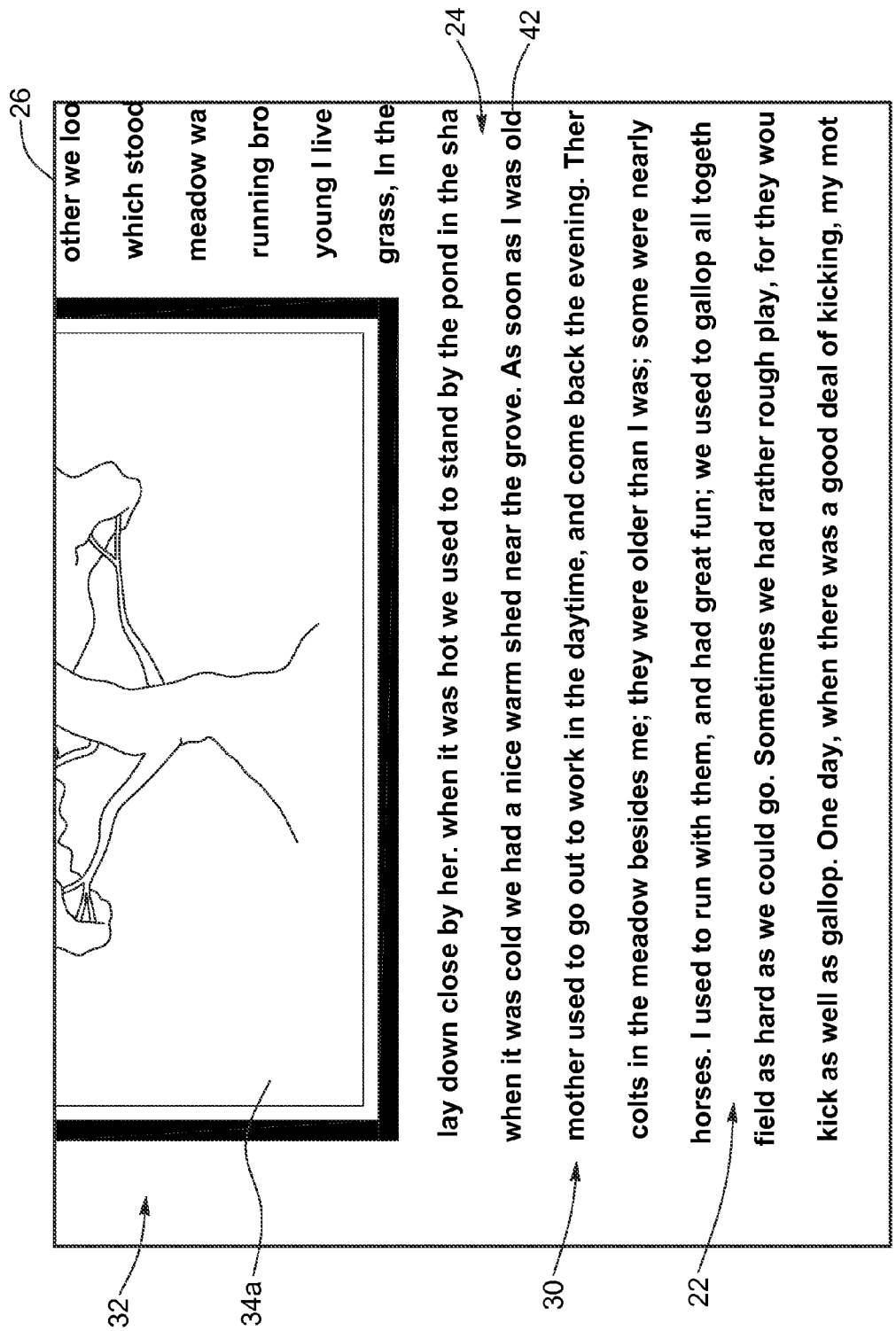
FIG. 6 is a view of the text-based representation of the portion of the working area that is presented to a user after the processing step of FIG. 2J is completed, in accordance with an exemplary embodiment.

Referring now to FIGS. 1A and 2J, upon completing the step 106 of performing the high-precision OCR process, the method 100 finally includes a step 108 of presenting the high-precision machine-encoded representation 30 of the portion of the working area to the user as the text-based representation 24, in replacement of the initial machine-encoded representation 28, as shown in FIGS. 2J and 6. In some embodiments, presenting 108 the high-precision machine-encoded representation 30 of the portion 214 of the working area 204 to the user as the text-based representation 24 includes rendering 140 the textual content 22 within the region of interest 26 as vector graphics 36, as shown in FIG. 1B.

For example, in one embodiment, the step of presenting the high-precision machine-encoded representation 30 may include displaying the machine-encoded text 42 of each refined text zone 1' to 4' in FIGS. 2I and 2J in the image 20 as vector graphics over the same background bitmap image on which the initial machine-encoded representation 28 (see FIG. 2H) was previously shown to the user and on which the non-textual content 32 was overlaid.

In another embodiment, such as in FIG. 1A, the step 108 of presenting the high-precision machine-encoded representation may include a substep of overlaying 138 the high-precision machine-encoded text of each refined text zone in the image as vector graphics on the respective bitmap-formatted textual content, and in replacement of the initial machine-encoded text of each initial text zone. It is to be noted that in FIG. 2J, each line of high-precision machine-encoded text 42 is schematically represented by a thin elongated rectangular strip with non-uniformly cross-hatched interior.

More specifically, in one embodiment the displaying of the high-precision machine-encoded text may be done according to the following sequence:
1. a background bitmap having a single and uniform color selected according to the low-vision user condition is provided. Preferably, the same background as for the fast OCR process is used.
2. Non-textual content (e.g., first and second pictures 34a, 34b) are redrawn on the background bitmap.
3. Upon processing text zone 1' to 4', lines of each text zone are displayed one line at a time on the background bitmap, each line being displayed in a single and uniform text color selected according to the low vision user condition.

As mentioned above, depending on the user's eye condition, certain text and background color combinations can allow for ease of reading. The overlay of the initial machine-encoded text described above can allow the user to always read text using an optimal text and background color combination. It is to be noted that this optimal text and background color combination is displayed independently of the text color or the background color of the original bitmap.

FIG. 2J shows the resulting image once the step of displaying the high-precision machine-encoded text 42 is completed for all the refine text zones 1' to 4'. The entire bitmap textual content 22 contained in the image 20 has been replaced by vector graphics generated by the high-precision OCR process. However, as for the fast OCR process, non-textual content 32 such as the first and second pictures 34a, 34b may still be presented in their original bitmap format.

Advantageously, the method according to embodiments of the invention allows that once the entire bitmap textual content contained in the image is replaced by vector graphics, the text-based representation of any portion of the working area becomes resolution-independent and can thus be readily represented at any desired resolution. The text-based representation of any portion of the working area is also displayed using foreground and background colors that are selected according to the user preferences.

Referring to FIG. 6, there is shown an example of the region of interest 26 as displayed to the user after the high-precision OCR process has been performed. By comparison to FIG. 5, it can be seen that all the textual information is now available and that the result includes less or no mistakes or typographical errors.

Method for Displaying a Working Area to a User

Figure 7:
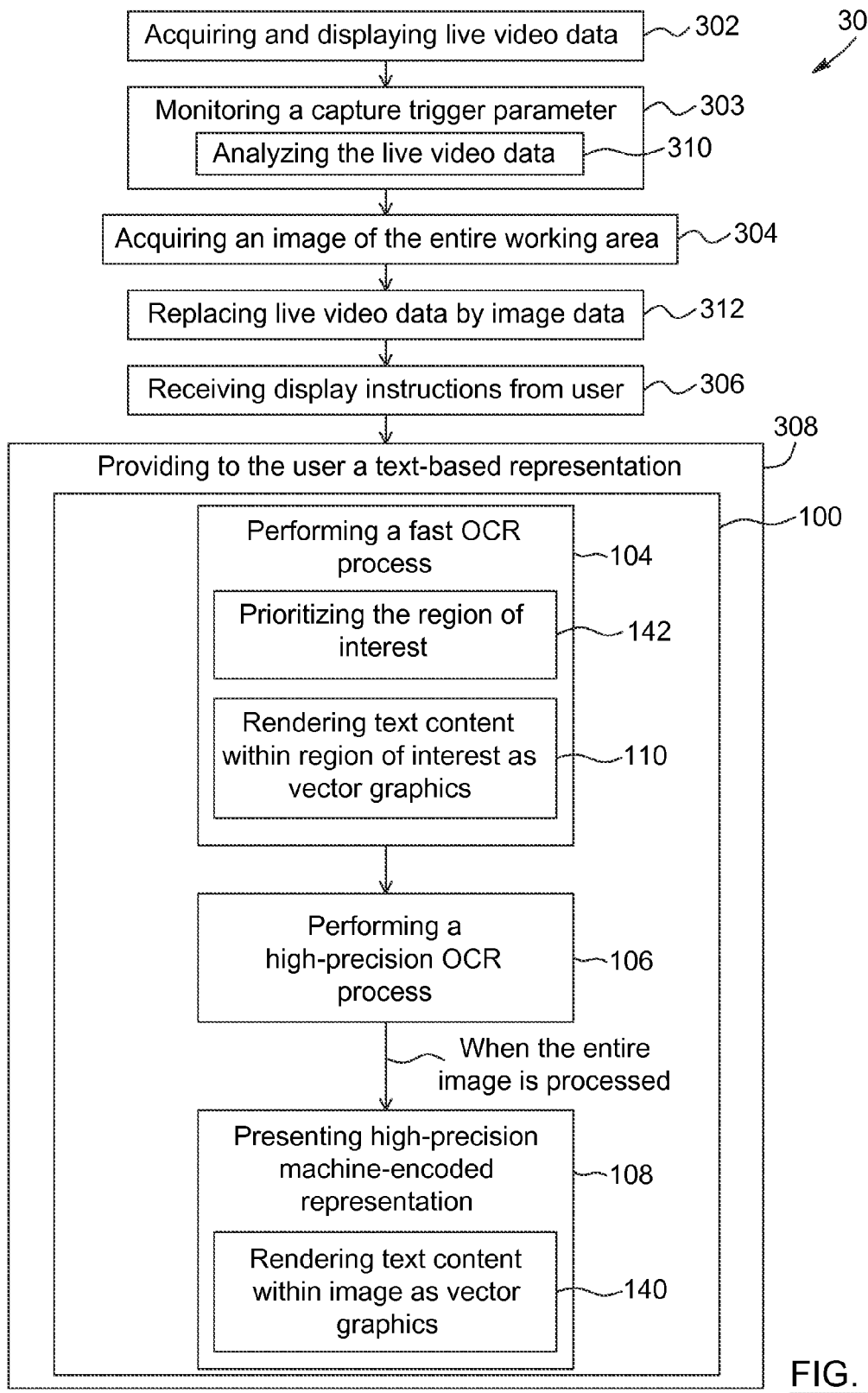
FIG. 7 is a flow chart of a method for displaying a working area to a user, in accordance with an exemplary embodiment.

In accordance with another aspect of the invention, there is provided a method 300 for displaying a working area to a user. FIG. 7 shows a flow chart of an embodiment of the method 300, which can, by way of example, be performed with a system 200 such as that illustrated in FIG. 3 or a similar system.

Referring to FIGS. 3 and 7, the method 300 first includes a step 302 of acquiring and displaying live video data of at least part of the working area 204.

The method 300 also includes a step 303 of monitoring at least one capture trigger parameter, and upon detection thereof, a step 304 of acquiring an image of the entire working area.

The term "capture trigger parameter" is understood herein to refer to any parameter that can be measured or any instruction that can be received in order to trigger the acquisition of an image of the entire working area. In a typical implementation, the live video image of at least part of the working area may be presented to the user while the user is positioning a document or other object on the working area. In such an embodiment, the capture trigger parameter may, for example, be an absence of movement within the working area detected for a certain period of time, for example 2 seconds. In some embodiments, the trigger parameter may also include a capture instruction from the user (e.g., through vocal instructions, pressing of a button or sensing of a movement from the user, etc.); or an absence or a presence of one or multiple targets having each a predefined shape within the working area. For example, in embodiment, the step 303 of monitoring of the capture trigger parameters may include analyzing 310 the live video data. The analyzing 310 of the live video data may involve monitoring at least one of the absence or presence of one or more targets, the movement of a user, the absence of motion of an object within the working area, and the like.

Once the capture trigger parameter has been detected and the image of the entire working area has been acquired, the live video feed displayed to the user may be replaced (step 312) by image data of the acquired image. This substitution may be unperceivable by the user, if the scene observed is static. In some embodiments, the image data presented to the user can represent the same scene as the scene previously displayed via the live video data. For example, if the displayed live video data corresponds to the entire working area, then the image data presented to the user in replacement of the live video data can also correspond to the entire working area.

The method 300 further includes a step 306 of receiving display instructions from the user identifying a portion of the working area for viewing, and displaying a corresponding portion of the high-resolution image. For example, receiving 306 display instructions from the user may include receiving from the user at least one of magnification and panning instructions as the user navigates on the displayed image and magnifies a portion of it corresponding to the region of interest.

The method 300 further includes a step 308 of providing to the user a text-based representation of a portion of the working area identified by the user. The step 308 of providing a text-based representation to the user can involve, inter alia, performing steps 104, 106 and 108 of the method 100 described above and illustrated in FIG. 1A to 2J. Fast and high-precision OCR processes are therefore performed and the displayed information adapted accordingly.

Figure 10:
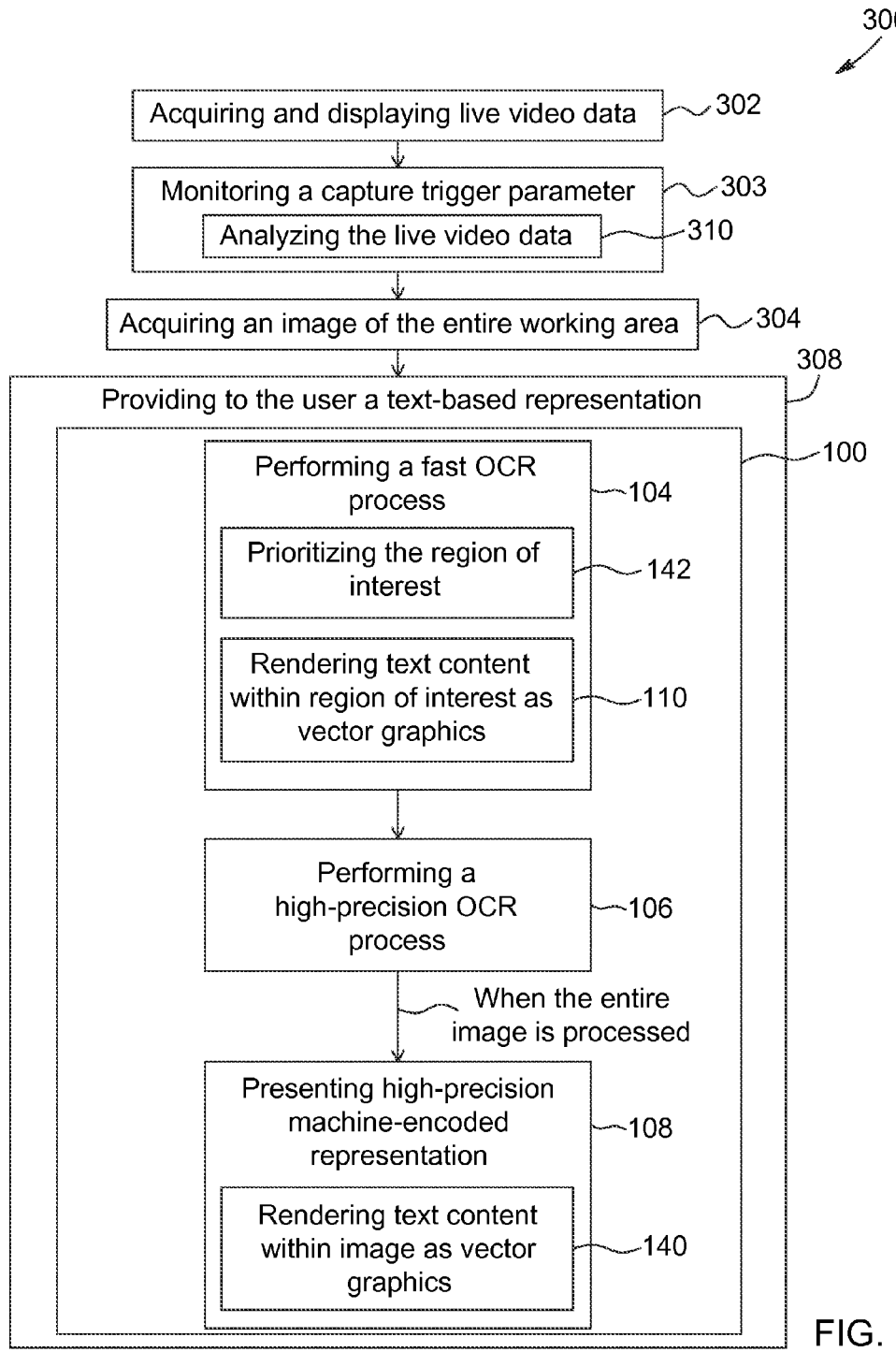
FIG. 10 is a flow chart of a method for displaying a working area to a user, in accordance with an exemplary embodiment.

Referring to FIG. 10, in some embodiments, at least one of the OCR processes, for example the fast OCR process, may be launched as soon as the image is acquired and before any display instructions are received from the user. For example, in some embodiments, the step 304 of acquiring the image of the entire working area can immediately trigger the start of the step 308 of providing to the user the text-based representation of the portion of the working area. In cases where the portion of the working area corresponds to the entire working area, the processing sequence may at first involve processing the page from top to bottom, and this sequence may be readjusted once a region of interest has been identified.

System for Providing a Text-Based Representation of a Portion of a Working Area to a User In accordance with another aspect of the invention, there is provided a system for providing a text-based representation of a portion of a working area to a user.

Referring to FIGS. 3 and 4, there is respectively shown a schematic perspective view and a schematic functional block diagram of an embodiment of the system 200. It will be understood that the system 200 can be used to perform the method 100 exemplified in the embodiments shown in FIGS. 1A to 2J, as well as the method 300 exemplified in the embodiment shown in FIG. 7.

Broadly described, the system 200 includes a camera unit 202 disposed over a working area 204 and having an image sensor 206 acquiring an image 20 (see, e.g., FIG. 2A) of the entire working area 204, and a processing unit 208 receiving the image 20 from the camera unit 202. The processing unit 208 includes a plurality of modules and sub-modules, which will be described in greater detail below, including a fast OCR module 210 and a high-precision OCR module 212 for respectively performing fast and high-precision OCR processes on at least a region of interest 26 of the image 20 (see, e.g., FIG. 2A) and obtaining initial and high-precision machine-encoded representations 28 and 30 (see FIGS. 2I and 2J) of the portion 214 of the working area 204. The processing unit 208 may also be provided with an output module 216 outputting one of the initial and high-precision machine-encoded representations 28 and 30 as the text-based representation 24 (see FIGS. 5 and 6, respectively). The system 200 may optionally include a display unit 218 for displaying to a user the text-based representation 24 output by the output module 216.

Camera Unit

Still referring to FIGS. 3 and 4, the system 200 first includes a camera unit 202 disposed over the working area 204 and having an image sensor 206 acquiring an image of the entire working area 204. In FIG. 3, the camera unit 202 is mounted on a frame structure 224 of the system 200 and has a field of view 222 encompassing the working area 204. The working area 204 is typically a flat surface on which a user may place an object to be magnified or otherwise viewed on the display unit 218. For example, the object may be a document 220 the user wishes to read. It will be understood that in the embodiment of FIG. 3, the system is intended to be used as a stand-alone device such that the camera unit 202 is incorporated into the frame structure 224 as an integral component of the system 200 that. However, in other embodiment, the camera unit 202 may be provided in a handheld device, which can be mounted on and docked to the frame structure 224 of the system 200, such that images of the working area 204 may be acquired by the camera unit 202 of the handheld device and be displayed on the display unit 218.

As used herein, the "camera unit" refers to any component or combination of components capable of acquiring an image of a scene, such as the working area 204 of the system 200 of FIG. 3. More particularly, the term "camera unit" is meant to encompass the imaging elements (e.g., imaging optics and the image sensor 206; see FIG. 4) and the camera circuitry associated therewith which are collectively used to acquire such an image. In some embodiments, the camera unit 202 is preferably a high-resolution digital camera, although lower resolution cameras or non-digital devices may be used without departing from the scope of the present invention.

The term "image sensor" as used herein refers to any photosensitive device able to detect optical radiation emitted or reflected by an object and use it to generate an image of the object based on the detected optical radiation. More particularly, an image sensor may be composed of a linear or two-dimensional array of light-sensitive elements (i.e. pixels), the number of which defines the resolution of the camera.

Referring to FIG. 4, the image sensor 206 may have a resolution of at least 2 megapixels. For example, in one embodiment, the image sensor 206 may have a resolution of 8 megapixels in RGBA format at 32 bits per pixel, corresponding, for example, to an array size of 3264×2448 pixels. However, it is to be understood that embodiments of the system 200 are not limited by the resolution of the image sensor 206 of the camera unit 202 and that numerous resolution values are understood to be encompassed within the scope of the present invention. It will be understood that the image sensor 206 is adapted to receive optical radiation from the working area 204 or from a document 220 placed thereon, and to convert the received optical radiation into electrical data representing an image of the object. The image sensor 206 is preferably embodied by complementary metal-oxide-semiconductor (CMOS) or charge-coupled device (CCD) pixel sensors, but other types of image sensors (e.g., charge injection devices or photo diode arrays) could be used without departing from the scope of the present invention.

Referring back to FIGS. 3 and 4, the camera unit 202 has a field of view 222 directed and extending toward the working area 204. As used herein, the term "field of view" generally refers to the solid angular extent of a given scene that is imaged by a camera. In general, the shape of the field of view of the camera unit 202 as a whole is defined or limited by the shape of the image sensor 206. In the embodiment of FIG. 3 the field of view 222 is rectangular but other shapes are possible in other embodiments. Moreover, it may be advantageous that the field of view 222 of the camera unit 202 be sufficiently wide to permit the system 200 to acquire an image of the entire surface of a document 220 having a typical letter size and being disposed on the working area 204.

It will be understood that once an object or a document 220 is placed on the working area 204, the user may be presented live video data on the display unit 218 representing the document 220 or a portion thereof, depending on the level of zoom selected by the user. The image 20 (see, e.g., FIG. 2A) of working area 204 on which is placed the document 220 may be acquired either by receiving instructions from the user, for example via a user interface 226 of the system 200, or automatically, for example once no motion or another capture trigger parameter is detected on the working area 204 for a predetermined period of time. In this regard, the processing unit 208 described below may include an capture trigger module 228 configured to monitor such a capture trigger parameter, so that upon detection of the capture trigger parameter, the capture trigger module 228 instructs the camera unit 202 to acquire the image 20 of the entire working area 214.

Processing Unit

Still referring to FIGS. 3 and 4, the system 200 also includes a processing unit 208 receiving the image from the camera unit 202.

In the present description, the term "processing unit" is understood to refer to a functional entity of the system 200 that controls and executes, at least partially, the operations required to provide the text-based representation of the portion 214 of the working area 204 to a user. In particular, as illustrated in FIG. 4, the processing unit 208 is preferably connected to various elements of the system 200 such as the camera unit 202 and the display unit 218 via various input/output (I/O) communication ports, such as camera ports and display ports.

It will be understood by one of ordinary skill in the art that the processing unit may be implemented as a single unit or as a plurality of interconnected processing sub-units. The processing unit may be embodied by a microprocessor, a central processing unit (CPU), a processing core, a microcontroller, a system on a chip (SoC), a digital signal processor (DSP), a programmable logic device, or by any other processing resource or any combination of such processing resources configured to operate collectively as a processing unit. In particular, this terminology should not be construed so as to limit the scope or application of the invention.

The processing unit will be described below as a series of various modules, each associated with one or more different functions. It will be readily understood by one of ordinary skill in the art that, in practice, each module may include a plurality of sub-modules, routines, components, communication ports, software and the like cooperating together in order to accomplish the corresponding function. It will be further understood that the subdivision into such modules is made from a conceptual standpoint only and that, in practice, a given hardware or software component may be shared by different modules, and that components of different modules may be combined together physically and logically without departing from the scope of the present invention. Preferably, the various physical components of the processing unit and the interconnections therebetween are disposed on an integrated circuit (IC) die, which is preferably mounted onto a printed circuit board (PCB).

Fast OCR Module

Referring to FIGS. 2A to 4, the processing unit 208 first includes a fast OCR module 210 for performing a fast OCR process on at least a region of interest 26 of the image 20 corresponding to the portion 214 of the working area 204. The fast OCR module 210 allows to rapidly obtaining an initial machine-encoded representation 28 of the portion 214 of the working area 204.

In some embodiments, the fast OCR module 210 may first include an initial-zoning sub-module 230 identifying initial text zones 1 to 9 within the image 20, wherein each initial text zone 1 to 9 includes textual content 22 in bitmap format. The fast OCR module 210 may also include a sequencing sub-module 232 determining a processing sequence for the initial text zones 1 to 9. Preferably, the processing sequence depends on an arrangement of the initial text zones 1 to 9 with respect to the region of interest 26 of the image 20, as described above in connection with the method 100 exemplified in FIGS. 1A to 2J. The sequencing sub-module 232 thus allows the fast OCR module to perform the fast OCR process on the initial text zones 1 to 9 according to a particular processing sequence. As also described above, in some embodiments, the processing sequence may give priority to one or more of the initial text zones 1 to 9 that intersect the region of interest 26.

Moreover, the fast OCR module 210 may be configured to generate, as the initial machine-encoded representation 28 of the portion 214 of the working area 204, and according to the processing sequence determined by the sequencing sub-module 232, initial machine-encoded text 36 corresponding to the textual content 22 of each initial text zone 1 to 9.

It will be understood that, upon a change in at least one of a size of the region of interest 26 and a position thereof within the image 20, the sequencing sub-module 232 preferably recalculates the processing sequence of the initial text zones 1 to 9 left to be processed based on the arrangement of the initial text zones 1 to 9 with respect to the new region of interest 26.

The fast OCR module 210 may also be provided with a ranking sub-module 234 assigning a respective sequential rank to each initial text zone 1 to 9, such that the sequencing sub-module 232 determines the processing sequence based on an arrangement of the initial text zones 1 to 9 with respect to the region of interest 26 and on the ranking of the initial text zone 1 to 9 established by the ranking sub-module 234.

High-Precision OCR Module

Still referring to FIGS. 2A to 4, the processing unit 208 also includes a high-precision OCR module 212 for performing a high-precision OCR process on at least a region of interest 26 of the image 20 corresponding to the portion 214 of the working area 204. The high-precision module 212 allows to rapidly obtaining a high-precision machine-encoded representation 30 of the portion 214 of the working area 204, as described above in connection with the method 100 exemplified in FIGS. 1A to 2J. Preferably, the high-precision OCR module 212 is configured to perform the high-precision OCR process on the image 20 of the entire working area 204.

In some embodiments, the high-precision OCR module 212 of the processing unit 208 may run on a separate process having a lower priority than the process on which runs the fast OCR module 210.

Similarly to the fast OCR module 210, the high-precision OCR module 212 may include a refined-zoning sub-module 238 identifying refined text zones 1' to 4' within the image 20, wherein the refined text zones 1' to 4' include textual content 22 in bitmap format. The high-precision OCR module 212 may perform the high-precision OCR process on the refined text zones 1' to 4' in a sequential manner. Alternatively, the refined text zones 1' to 4' may be processed according to any appropriate processing order. It will be understood that the number, size and arrangement of the refined text zones 1' to 4' established by the refined-zoning sub-module 238 generally differ from those of the initial text zones 1 to 9 established by the initial-zoning sub-module 230.

Output Module

Referring to FIGS. 2A to 4, the processing unit 208 further includes an output module 216. The output module 216 is configured to initially output, as the text-based representation 24, the initial machine-encoded representation 28 of the portion 214 of the working area 204 generated by the fast OCR module 210. The output module 216 is also configured to subsequently replace, upon completion of the high-precision OCR process, the initial machine-encoded representation 28 with the high-precision machine-encoded representation 30 generated by the high-precision OCR module 212.

In some embodiments, the output module 216 may include an initial OCR image sub-module 240 configured to prepare the text-based representation to be displayed to the user and incorporating the vector graphics of the initial text zone 1 to 9.

More specifically, in one embodiment the initial OCR image sub-module 240 can execute the following sequence:
1. The entire bitmap of the page is erased and replaced by a background bitmap having a single and uniform color selected according to the low vision user condition.
2. Non-textual content contained on the original bitmap such as pictures are redrawn on the background bitmap.
3. As processing on the initial text zones according to the processing sequence is being performed, lines of each initial text zone are displayed one line at a time on the background bitmap, each line being displayed in a single and uniform text color selected according to the low vision user condition.

Similarly, the output module 216 also includes a high-precision OCR image sub-module 242 configured to prepare the text-based representation to be image to be displayed to the user and incorporating vector graphics of the high-precision machine-encoded text 42 of each refined text zone 1' to 4'. The high-precision OCR image sub-module 242 may involve similar routines as those performed by the initial OCR image sub-module 240.

Depending on the user's eye condition, certain text and background color combinations can allow for ease of reading. The overlay of the initial machine-encoded text described above can allow the user to always read text using an optimal text and background color combination. It is to be noted that this optimal text and background color combination is displayed independently of the text color or the background color of the original bitmap.

It will be understood that in some embodiments, the initial and the high-precision OCR image sub-modules 240 and 242 may be embodied by the same sub-modules of the output module 216. In other embodiments, the initial and the high-precision OCR image sub-modules 240 and 242 may be part of the fast and the high-precision OCR modules 210 and 212, respectively. In still yet other embodiments, both the initial and the high-precision OCR image sub-modules 240 and 242 may be located both in one and the same of the fast and the high-precision OCR modules 210 and 212.

Figure 8:
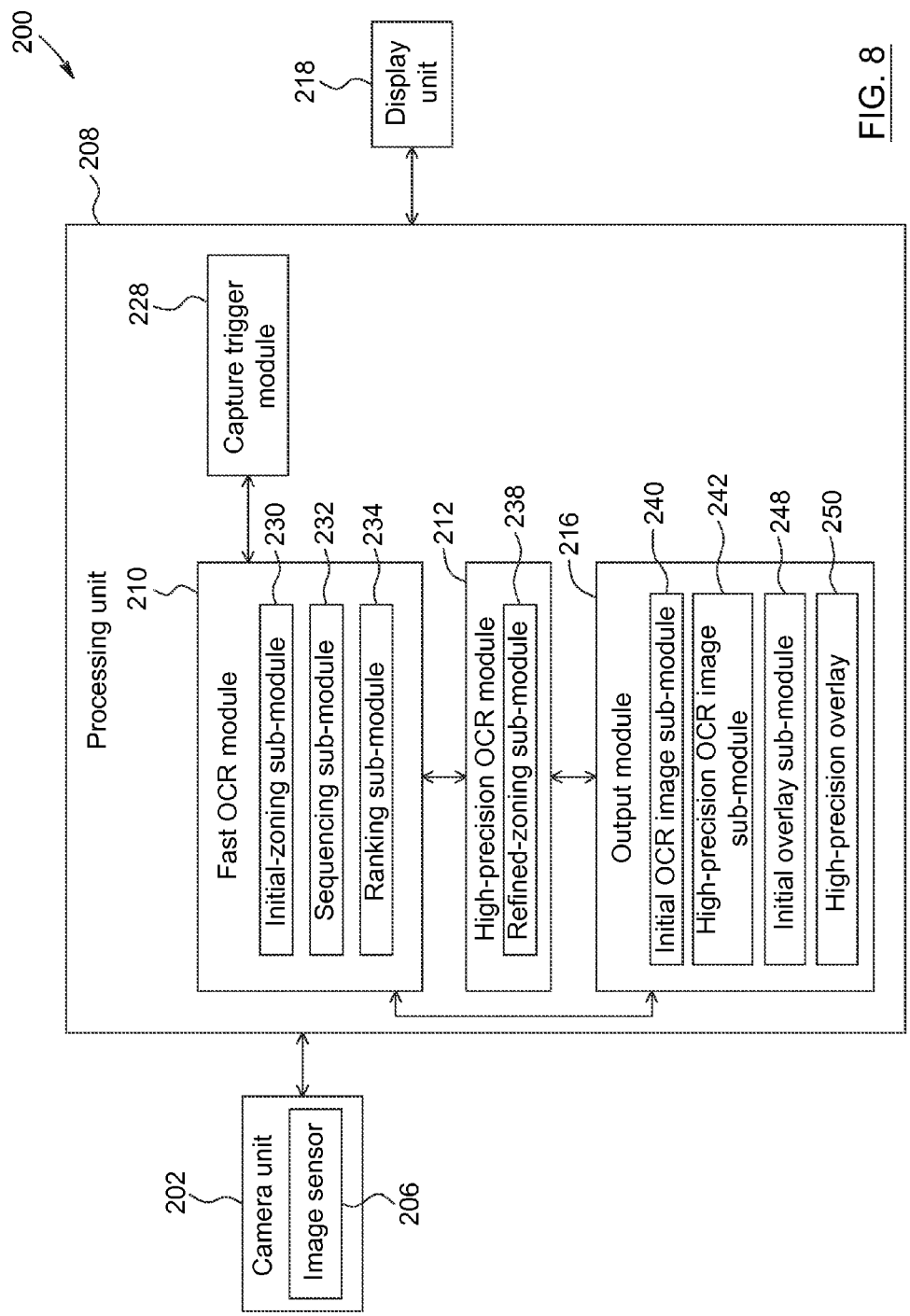
FIG. 8 is a schematic functional block diagram of a system for providing a text-based representation of a portion of a working area to a user, in accordance with an exemplary embodiment.

In some embodiments, the output module 216 may further include a rendering sub-module 244 for rendering textual content 22 within the region of interest 26 as vector graphics. Referring to FIG. 8, in some embodiments, the output module 216 can include an initial overlay sub-module 248 configured to overlay the initial machine-encoded text of each initial text zone in the image as vector graphics over the respective bitmap-formatted textual content. The output module 216 can also include a high-precision overlay sub-module 250 configured to overlay the high-precision machine-encoded text of each refined text zone in the image as vector graphics over the respective bitmap-formatted textual content. In other embodiments, the initial overlay sub-module and the high-precision overlay sub-module may be embodied by the same sub-module. In still other embodiments, each of the initial and high-precision overlay sub-module may be embodied or be part of the rendering sub-module 244.

Display Unit

As mentioned above, the system 200 may optionally include a display unit 218 receiving the text-based representation 24 output by the output module 216 and presenting the same to the user. In the embodiment of FIG. 3, the display unit 218 is preferably mounted on a display support 246 of the frame structure 224. However, the system 200 may have a different configuration than the one shown in the FIG. 3, such that other embodiments the display unit 218 may be provided a stand-alone unit not physically connected to the frame structure 224. The display unit 218 may be embodied by any type of display technology, such as liquid crystal display (LCD), light-emitting diode (LED), organic LED (OLED), plasma display panel (PDP), light-emitting polymer display (LPD) or active-matrix OLED (AMOLED) technology. For example, in one embodiment, the display unit 218 uses LCD display technology with LED backlight.

In some embodiments, the system 200 may additionally or alternatively include a speaker device in communication with the processing unit 208 for outputting the text-based representation as a speech output. The system 200 may also include a Braille display in communication with the processing unit 208 for outputting the text-based representation as Braille content.

Of course, numerous modifications could be made to the embodiments described above without departing from the scope of the present invention.

The invention claimed is:
1. A method for providing a text-based representation of a portion of a working area to a user, the method comprising the steps of:
   a) acquiring an image of the entire working area;
   b) performing a fast OCR process on at least a region of interest of the image corresponding to the portion of the working area, thereby rapidly obtaining an initial machine-encoded representation of the portion of the working area, and immediately presenting the same to the user as the text-based representation;

c) in parallel to step b), performing a high-precision OCR process on at least the region of interest of the image, thereby obtaining a high-precision machine-encoded representation of the portion of the working area; and d) upon completion of the high-precision OCR process, presenting the high-precision machine-encoded representation of the portion of the working area to the user as the text-based representation, in replacement of the initial machine-encoded representation.

2. The method according to claim 1, comprising, between steps a) and b), a step of displaying the region of interest of the image to the user.

3. The method according to claim 1, wherein step b) comprises performing the fast OCR process by processing the region of interest in a prioritized manner.

4. The method according to claim 1, wherein, in step b), performing the fast OCR process comprises the preliminary substeps of:
   i) identifying initial text zones within the image, each initial text zone comprising textual content in bitmap format; and
   ii) determining a processing sequence for performing the fast OCR process on the initial text zones based on an arrangement of the initial text zones with respect to the region of interest.

5. The method according to claim 4, wherein, in step b), obtaining the initial machine-encoded representation of the portion of the working area comprises obtaining initial machine-encoded text corresponding to the textual content of each initial text zone by performing the fast OCR process on the initial text zones according to the processing sequence.

6. The method according to claim 5, wherein, in step b), presenting the initial machine-encoded representation of the portion of the working area to the user comprises overlaying the initial machine-encoded text of each initial text zone in the image as vector graphics on the respective bitmap-formatted textual content.

7. The method according to claim 4, wherein, upon a change in at least one of a size and a position of the region of interest, step b) further comprises recalculating the processing sequence of unprocessed ones of the initial text zones based on the arrangement of the unprocessed ones of the initial text zones with respect to the region of interest after said change.

8. The method according to claim 4, wherein substep ii) further comprises
   assigning a respective sequential rank to each initial text zone; and
   determining the processing sequence based on the arrangement of the initial text zones with respect to the region of interest and the sequential ranks respectively assigned to the initial text zones.

9. The method according to claim 4, wherein step b) further comprises, before substep i), a substep of imposing a size limit on the initial text zones.

10. The method according to claim 1, wherein, in step b), presenting the initial machine-encoded representation of the portion of the working area to the user as the text-based representation comprises rendering textual content within the region of interest as vector graphics.

11. The method according to claim 1, wherein step c) comprises the substeps of:
    i) identifying refined text zones within the image, each refined text zone comprising textual content in bitmap format; and
    ii) obtaining high-precision machine-encoded text corresponding to the textual content of each refined text zone by performing the high-precision OCR process on the refined text zones.

12. The method according to claim 11, substep ii) of step c) comprises performing the high-precision OCR process on the refined text zones in a sequential manner.

13. The method according to claim 11, wherein, in step d), presenting the high-precision machine-encoded representation of the portion of the working area to the user as the text-based representation comprises overlaying the high-precision machine-encoded text of each refined text zone in the image as vector graphics on the respective bitmap-formatted textual content.

14. A method for displaying a working area to a user, the method comprising the steps of:
    acquiring and displaying live video data of at least a part of the working area;
    monitoring a capture trigger parameter, and upon detection thereof, acquiring an image of the entire working area; and
    providing to the user a text-based representation of a portion of the working area identified by the user, comprising:
       performing a fast OCR process on at least a region of interest of the image corresponding to the portion of the working area, thereby rapidly obtaining an initial machine-encoded representation of the portion of the working area, and immediately presenting the same to the user as the text-based representation;
       in parallel to the fast OCR process, performing a high-precision OCR process on at least the region of interest of the image, thereby obtaining a high-precision machine-encoded representation of the portion of the working area; and
       upon completion of the high-precision OCR process, presenting the high-precision machine-encoded representation of the portion of the working area to the user as the text-based representation, in replacement of the initial machine-encoded representation.

15. The method according to claim 14, wherein the capture trigger parameter comprises one of an absence of movement within the working area, an OCR instruction from the user, and an absence or a presence of a target within the working area.

16. The method according to claim 14, further comprising, after the step of acquiring the image of the entire working area, a step of displaying, in replacement of the live video data, image data from the image.

17. The method according to claim 14, further comprising, before the step of providing to the user a text-based representation of a portion of the working area, a step of receiving display instructions from the user identifying the portion of the working area.

18. The method according to claim 17, wherein the display instructions received from the user comprise at least one of magnification and panning instructions.

19. The method according to claim 14, wherein the step of acquiring the image of the entire working area triggers the step of providing to the user the text-based representation of the portion of the working area.

20. A system for providing a text-based representation of a portion of a working area to a user, the system comprising:
    a camera unit disposed over the working area and having an image sensor acquiring an image of the entire working area; and a processing unit receiving the image from the camera unit and comprising:
- a fast OCR module for performing a fast OCR process on at least a region of interest of the image corresponding to the portion of the working area, thereby rapidly obtaining an initial machine-encoded representation of the portion of the working area;
- a high-precision OCR module for performing a high-precision OCR process on at least the region of interest of the image, thereby obtaining a high-precision machine-encoded representation of the portion of the working area;
- an output module initially outputting, as the text-based representation, the initial machine-encoded representation of the portion of the working area and replacing the same with the high-precision machine-encoded representation upon completion of the high-precision OCR process.

21. The system according to claim 20, wherein the fast OCR module comprises:
- an initial-zoning sub-module identifying initial text zones within the image, each initial text zone comprising textual content in bitmap format; and
- a sequencing sub-module determining a processing sequence such that the fast OCR module performs the fast OCR process on the initial text zones based on an arrangement of the initial text zones with respect to the region of interest.

22. The system according to claim 21, wherein the fast OCR module is configured to generate, as the initial machine-encoded representation of the portion of the working area and according to the processing sequence determined by the sequencing sub-module, initial machine-encoded text corresponding to the textual content of each initial text zone.

23. The system according to claim 21, wherein, upon a change in at least one of a size and a position of the region of interest, the sequencing sub-module recalculates the processing sequence of unprocessed ones of the initial text zones based on the arrangement of the unprocessed ones of the initial text zones with respect to the region of interest after said change.

24. The system according to claim 21, wherein the fast OCR module further comprises a ranking sub-module assigning a respective sequential rank to each initial text zone, such that the sequencing sub-module determines the processing sequence based on the arrangement of the initial text zones with respect to the region of interest and the sequential ranks respectively assigned to the initial text zones.

25. The system according to claim 20, wherein the high-precision OCR module comprises a refined-zoning sub-module identifying refined text zones within the image, each refined text zone comprising textual content in bitmap format, such that the high-precision OCR module performs the high-precision OCR process on the refined text zones.

26. The system according to claim 20, wherein the output module comprises a rendering sub-module for rendering textual content within the region of interest as vector graphics.

27. The system according to claim 20, further comprising a display unit receiving the text-based representation output by the output module and displaying the same to the user.

* * * * *